United States Patent
Fink

(10) Patent No.: US 10,474,419 B2
(45) Date of Patent: Nov. 12, 2019

(54) AUDIO DIGITAL SIGNAL PROCESSOR UTILIZING A HYBRID NETWORK ARCHITECTURE

(71) Applicant: Crestron Electronics, Inc., Rockleigh, NJ (US)

(72) Inventor: Dennis Fink, Rockleigh, NJ (US)

(73) Assignee: Crestron Electronics, Inc., Rockleigh, NJ (US)

( * ) Notice: Subject to any disclaimer, the term of this patent is extended or adjusted under 35 U.S.C. 154(b) by 0 days.

(21) Appl. No.: 15/614,006

(22) Filed: Jun. 5, 2017

(65) Prior Publication Data

US 2017/0352357 A1 Dec. 7, 2017

Related U.S. Application Data

(60) Provisional application No. 62/345,326, filed on Jun. 3, 2016.

(51) Int. Cl.
*G06F 3/16* (2006.01)

(52) U.S. Cl.
CPC .............. *G06F 3/162* (2013.01); *G06F 3/165* (2013.01); *H04R 2420/01* (2013.01); *H04S 2400/03* (2013.01)

(58) Field of Classification Search
CPC ....... H04R 25/43; H04R 2420/01; G06F 3/16; G06F 3/162; G06F 3/165; H04N 5/265
See application file for complete search history.

(56) References Cited

U.S. PATENT DOCUMENTS

| 2006/0015200 | A1* | 1/2006 | Takemura | H04H 60/04 700/94 |
| 2009/0248183 | A1* | 10/2009 | Miwa | H04H 60/04 700/94 |

* cited by examiner

*Primary Examiner* — Andrew C Flanders
(74) *Attorney, Agent, or Firm* — Crestron Electronics, Inc.

(57) ABSTRACT

A system and method executed by audio processing software on one or more electronic devices in a computer system to process digital audio signals. The system comprises a digitizer for digitizing a received audio signal; and processor for performing a plurality of audio processing functions on the digitized audio signals, each of the audio processing functions having at least one programmable parameter, and wherein each of the audio processing functions are categorized and grouped as audio objects, and organized into a channel strip, the channel strip processing digitized audio signals for a particular received audio signal, and wherein, the audio objects are fixed in order, so that the digitized received audio signals are processed by a predefined number of N audio objects, and wherein the N audio objects occur in a fixed sequence, and further wherein, the N audio objects comprise a first subset of non-exchangeable audio objects and a second subset of exchangeable audio objects, such that any one or more of the second subset of audio objects can be exchanged by a replacement audio object, and further wherein when the audio processing functions are programmed, they can be saved without compiling the audio processing software.

3 Claims, 12 Drawing Sheets

Fixed Architecture
-No Compiling-

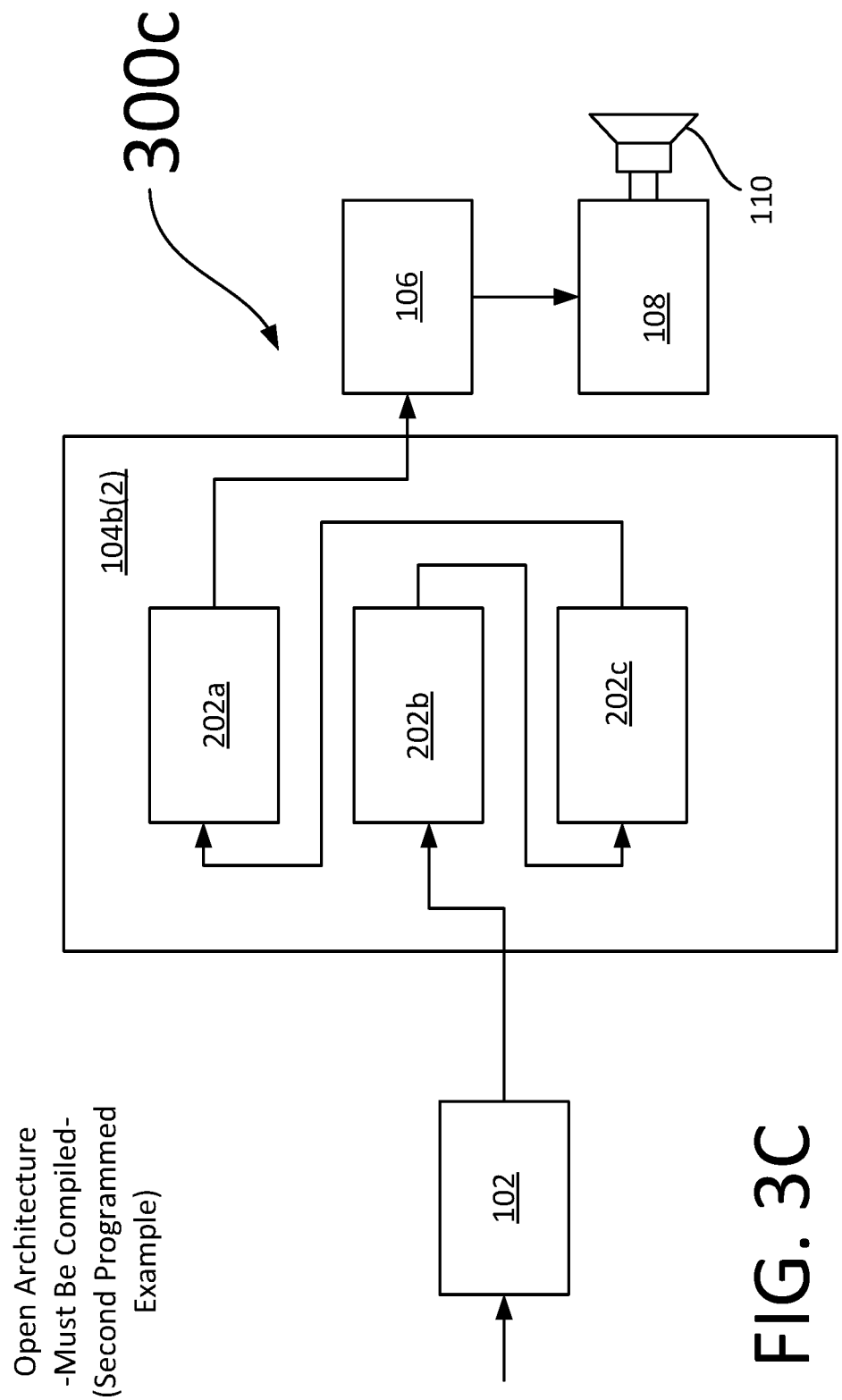

AUDIO DIGITAL SIGNAL PROCESSOR UTILIZING A HYBRID NETWORK ARCHITECTURE

PRIORITY INFORMATION

The present application claims priority under 35 U.S.C. § 119(e) to U.S. Provisional Patent Application Ser. No. 62/345,326, filed 3 Jun. 2016, the entire contents of which are expressly incorporated herein by reference.

BACKGROUND

Technical Field

The embodiments described herein relate generally to digital signal processors, and more specifically to systems, methods, and modes for audio digital signal processors (DSP) that incorporate a hybrid network architecture for processing graphical user images and other objects of DSP functionality.

Background Art

FIG. 1 illustrates a simplified block diagram of a known digital signal processor system (DSP) 100. DSP system 100 includes analog-to-digital converter (ADC) 102, digital processor 104, digital-to-analog converter (DAC) 106, amplifier 108, and speaker 110. Each of these components are generally known to those of skill in the art, with the exception of the programming and configuration of digital processor 104 (and which, in regard to the aspects of the embodiments, is described in greater detail below), and thus the same need not be discussed in detail in fulfillment of the dual purposes of clarity and brevity. DSPs 100 are devices that process input audio signals (usually there are at least two, and as many as sixteen or even more input channels) to produce a desired effect on the input audio signals and to output the same. DSP 104 is a specialized microprocessor (or programmable gate array, or other processor based circuitry), with its architecture optimized for the operational needs of digital signal processing. As their name implies, DSPs 104 chiefly operate in the digital realm; however, they can receive analog audio signals, digitize them, process the digitized or digital audio signals, and then output an analog or digital signal (that is, ADC 102, DAC 106, and even amplifier 108 can be integrated into a single DSP 104). In DSPs 104, a user can create filters (band-pass, high pass, low pass, and notch filters), equalizers (which attenuate or amplify different frequency bands), mixers, matrices, and other components known to those of skill in the art.

Presently available DSPs 104 are often very difficult to create, and difficult to use. Each of the DSP functions discussed above, and more, are generally implemented through programming. In some cases, the use of field programmable gate arrays (FPGAs) simplify the task, but in others, circuits have been designed that include microprocessors. Consequently, different programming languages have been used to program the different objects and functions. In addition, the use of application specific integrated circuits (ASICs) have become more prevalent, and specially designed processors are being used. Furthermore, advanced user interfaces have improved the usability of DSPs 104 and the programming of their objects and functions. Thus, currently available DSPs 104 have improved significantly over their predecessors. Modern DSPs 104 now include sophisticated user interfaces, as well as system architectures.

Currently there are two main types of DSP architectures commercially available: Fixed and Open. In computer engineering, of which DSPs 104 are a particular subset of specialized operation, computer architecture is a set of rules and methods that describe the functionality, organization, and implementation of the computer systems (or, in this case, the DSP system 100). Or, computer architecture, like other architecture, is the art of determining the needs of the user of a structure and then designing to meet those needs as effectively as possible within economic and technological constraints.

Both of the existing types of DSP architecture suffer from drawbacks.

In the fixed architecture type of DSP, while simple to use, lacks versatility. FIG. 2 illustrates an interconnection block diagram of fixed architecture DSP 104a, i.e., fixed architecture DSP audio system 200. While dropdown menus allow the user to change the parameters of each object 202 of DSP 104a the signal flow between different objects is fixed; this means that there is no ability to change the order of processing, or how the blocks of processing can be arranged. In the context of a DSP, block 202 is a process—filter, amplifier, delay, echo, equalizer, among others. Each object can have one or more functions; for example, an equalizer object can include a parametric equalizer, graphic equalizer, band equalizer, among other types. A prime characteristic of fixed architecture DSP 104a is that although function parameters can be changed, and then therefore saved, re-compiling of the DSP software processing code is not required after such changes. The program only needs to be saved. The re-programmed DSP program can be copied and used in different applications if desired.

In FIG. 2 DSP 104a comprises first block 202a (gain), second block 202b (parametric equalizer (PEQ)), and third block 202c (gate (GTE)). As can be seen in FIG. 2, the input digital signals are received by gain block 202a, the output of which is input to PEQ block 202b, the output of which is input to GTE block 202c. In fixed architecture DSP 104a, the order of processing between and among blocks 202 cannot be changed; only the variable parameters of each block 202 can be changed in a user interface (UI). For example, for gain block 202a, the parameter would be the gain—which could range from a negative gain (i.e., attenuation) to positive gain (e.g., from about −20 dB to about +20 dB of gain).

As those of skill in the art can appreciate, typically the signal flow in a fixed structure DSP 104a occurs with constant latency. That is, the delay in different functional implementations will always generally be about the same. While there is no need to compile the "program" the user implements in the UI, the architecture of fixed DSP 104a requires users to manually set many of the DSP parameters for each input and output signal path, as described above. In fixed DSP 104a architecture, blocks 202 are pre-arranged, in a fixed manner, with the digital audio flow path proscribed for the user; there is very low or no creativity in terms of how blocks 202 are arranged, and the path the digital audio signals take. The user can manage the specifications for each block 202 (the cutoff frequencies of LPFs, the amount of gain etc.). What is gained, however, is productivity and workflow. Delays and processing times are known in fixed DSP 104a. Examples of manufacturers that sell fixed architecture type DSPs are Clear One, Polycom, and Extron, among others.

The second type of DSP architecture currently available is an open architecture; DSP 104b, as shown in FIGS. 3A, 3B, and 3B. An open architecture can be characterized by a plain, open grid in the UI, such that the user can drag and drop interconnections between objects 202 (such as those shown in FIG. 2, first block 202a (gain), second block 202b (PEQ), and third block 202c (GTE), but which can also include filters, acoustic echo cancellation (AEC), and other types of equalizers (EQs), among others). As those of skill in the art can appreciate, interconnects are the paths of the digital audio signals between blocks 202. As those of skill in the art can further appreciate, each time a path is changed, the entire DSP program needs to be re-compiled and re-loaded into the DSP hardware. While there is lots of creative freedom, there is also low productivity and workflow.

FIG. 3A illustrates an example of an un-programmed, not-yet compiled open architecture DSP (DSP) 104b, i.e., open architecture DSP audio system 300. In an open architecture, the user is able to configure a greater part of the signal flow. It is more versatile, but also more complicated to use. The latency can vary in the different functional implementations, and therefore latency compensation must be included. Compilation must occur during the design phase (as those of skill in the art can appreciate, this typically is one of the last steps in the design of the DSP system). The use of an open architecture typically requires an advanced audio engineer or technician to implement. In addition, the use of third party control systems can be difficult to integrate. Finally, the UI generally presents a "rat's nest" schematic view of the DSP process(es). In FIG. 3A, lines A, B, and C represent the interconnects that can be manipulated according to the desires of the audio engineer (FIGS. 3B and 3C, discussed below, illustrate a first and second example of programmed (and subsequently compiled) open architecture DSPs 104b(1), and 104b(2). Examples of manufacturers that produce and sell open architecture DSPs are BiAmp, Symmetrix, and BSS, among others.

FIG. 3B illustrates a first example of open architecture DSP 104b(1), with an interconnection substantially similar to that of fixed architecture DSP 104a as illustrated in FIG. 2. The difference, however, is that when a user accesses fixed DSP 104b UI, there are no interconnects between the blocks of FIG. 3B; it is essentially a "blank slate," in that regard. The same is true for the open architecture illustrated in FIG. 3C, but in the latter case, the interconnections have been accomplished in a substantially different manner and there will be different sound produced by speaker 110. In FIG. 3C, the user has connected the input digital signals to PEQ block 202b, in which certain frequency bands of signals will be attenuated, while others will be allowed to pass without significant attenuation; following PEQ block 202b, the signals are directed to GTE block 202c, and then gain block 202a. Because gain block 202a follows PEQ block 202b, the sound that is produced by speaker 110 in open DSP 104b(2) of FIG. 3C will be or can be substantially different than the sound produced by speaker 110 in open DSP 104b(1) of FIG. 3B.

Those of skill in the art can appreciate that in existing open and fixed architecture DSP systems, there can be numerous controls for each opened DSP object (e.g., gain object 202a, PEQ object 202b, and GTE object 202c). If a user wants to use these with a different device, such as a touch screen (TS) interface device, then the user needs to open the DSP tool, click on each object that the user wants to import to the TS software configuration screen, open the control properties, which consists of at least two files, (1) object type, and (2) identification, and then each must be cut and paste into the software (SW) module that is used to design/implement the TS device. FIG. 4 illustrates a file transfer process (process 400) for different objects in existing digital signal processing systems.

In process step 402, the user opens the UI for an existing DSP device; then, in step 404, the user selects the first of N objects that are to be programmed. For example, the user can select second object 202b (PEQ) to program. The user adjusts all of the parameters as desired for the selected object (step 406), and in step 408 the selected object file is saved and closed. When this occurs, in "unseen" process step 410, the UI program creates two files: an object type file and the parameter file. Steps 404-410 are then repeated for each object as desired by the user. In process step 412 the files are saved, and then transferred to a new device in which to use the DSP programmed settings for objects. In order to import the object and parameter files, each must be copied and pasted into the new device.

As those of skill in the art can appreciate, this process is tedious, and error laden, and is likely that many mistakes can occur when performing the file transfer process.

As those of skill in the art can appreciate, the matrix of connections for a DSP is often too expansive to view or manipulate on a user interface. Additionally, when it comes to the DSP matrix, users tend to "think" in sections.

Current solutions involve expanding and contracting trees to focus on the relevant sections. However, this approach is limited as the expansion only works in one dimension, similar to the expansion with directory and file structures.

As those of skill in the art can further appreciate, the inability to use a single DSP device to equalize a room means that a spectrum analyzer and pink noise generator, among other devices, must be brought to each room.

Accordingly, a need has arisen for a suite of DSP tools that is easier to program and use and change than has been previously available, and which has additional features that many of those of skill in the art find desirable.

SUMMARY

It is an object of the embodiments to substantially solve at least the problems and/or disadvantages discussed above, and to provide at least one or more of the advantages described below.

It is therefore a general aspect of the embodiments to provide audio systems, methods, and modes for audio digital signal processors (DSP) that incorporate a hybrid network architecture for processing graphical user images and other objects of DSP functionality that will obviate or minimize problems of the type previously described.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Further features and advantages of the aspects of the embodiments, as well as the structure and operation of the various embodiments, are described in detail below with reference to the accompanying drawings. It is noted that the aspects of the embodiments are not limited to the specific embodiments described herein. Such embodiments are presented herein for illustrative purposes only. Additional embodiments will be apparent to persons skilled in the relevant art(s) based on the teachings contained herein.

According to a first aspect of the embodiments, a method executed by audio processing software on one or more electronic devices in a computer system to process digital audio signals is provided, the method comprising: digitizing a received audio signal; and performing a plurality of audio processing functions on the digitized audio signals, each of the audio processing functions having at least one programmable parameter, and wherein each of the audio processing functions are categorized and grouped as audio objects, and organized into a channel strip, the channel strip processing digitized audio signals for a particular received audio signal, and wherein, the audio objects are fixed in order, so that the digitized received audio signals are processed by a predefined number of N audio objects, and wherein the N audio objects occur in a fixed sequence, and further wherein, the N audio objects comprise a first subset of non-exchangeable audio objects and a second subset of exchangeable audio objects, such that any one or more of the second subset of audio objects can be exchanged by a replacement audio object, and further wherein when the audio processing functions are programmed, they can be saved without compiling the audio processing software.

According to a second aspects of the embodiments, a computer system for processing digital audio signals is provided, the system comprising: a digitizer adapted to digitize an audio signal; and a processor that comprises a computer program, the computer program including non-transitory executable software code that, when executed, is adapted to perform a plurality of audio processing functions on the digitized audio signals, each of the audio processing functions having at least one programmable parameter, and wherein each of the audio processing functions are categorized and grouped as audio objects, and organized into a channel strip, the channel strip processing digitized audio signals for a particular received audio signal, and wherein, the audio objects are fixed in order, so that the digitized received audio signals are processed by a predefined number of N audio objects, and wherein the N audio objects occur in a fixed sequence, and further wherein, the N audio objects comprise a first subset of non-exchangeable audio objects and a second subset of exchangeable audio objects, such that any one or more of the second subset of audio objects can be exchanged by a replacement audio object, and further wherein when the audio processing functions are programmed, they can be saved without compiling the audio processing software.

According to a third aspect of the embodiments, a non-transitory machine readable storage medium is provided the non-transitory machine readable storage medium having stored thereon a computer program for processing digitized audio signals, the computer program comprising a routine set of instructions for causing the machine to perform the steps of: digitizing a received audio signal; and performing a plurality of audio processing functions on the digitized audio signals, each of the audio processing functions having at least one programmable parameter, and wherein each of the audio processing functions are categorized and grouped as audio objects, and organized into a channel strip, the channel strip processing digitized audio signals for a particular received audio signal, and wherein, the audio objects are fixed in order, so that the digitized received audio signals are processed by a predefined number of N audio objects, and wherein the N audio objects occur in a fixed sequence, and further wherein, the N audio objects comprise a first subset of non-exchangeable audio objects and a second subset of exchangeable audio objects, such that any one or more of the second subset of audio objects can be exchanged by a replacement audio object, and further wherein when the audio processing functions are programmed, they can be saved without compiling the audio processing software.

BRIEF DESCRIPTION OF THE DRAWINGS

The above and other objects and features of the embodiments will become apparent and more readily appreciated from the following description of the embodiments with reference to the following figures. Different aspects of the embodiments are illustrated in reference figures of the drawings. It is intended that the embodiments and figures disclosed herein are to be considered to be illustrative rather than limiting. The components in the drawings are not necessarily drawn to scale, emphasis instead being placed upon clearly illustrating the principles of the aspects of the embodiments. In the drawings, like reference numerals designate corresponding parts throughout the several views.

FIG. 3C illustrates a second simplified interconnection block diagram of an open digital signal processor system.

DETAILED DESCRIPTION

Figure 1:
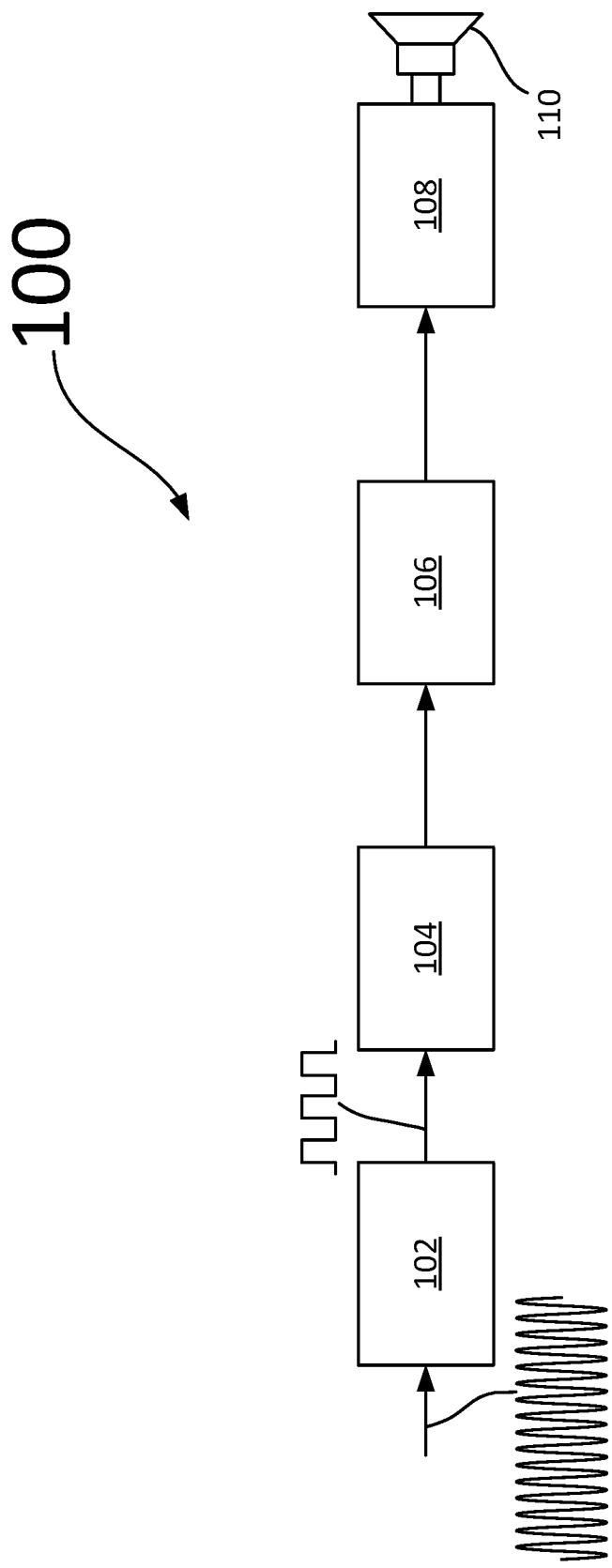
FIG. 1 illustrates a simplified block diagram of a known digital signal processor system.
Figure 2:
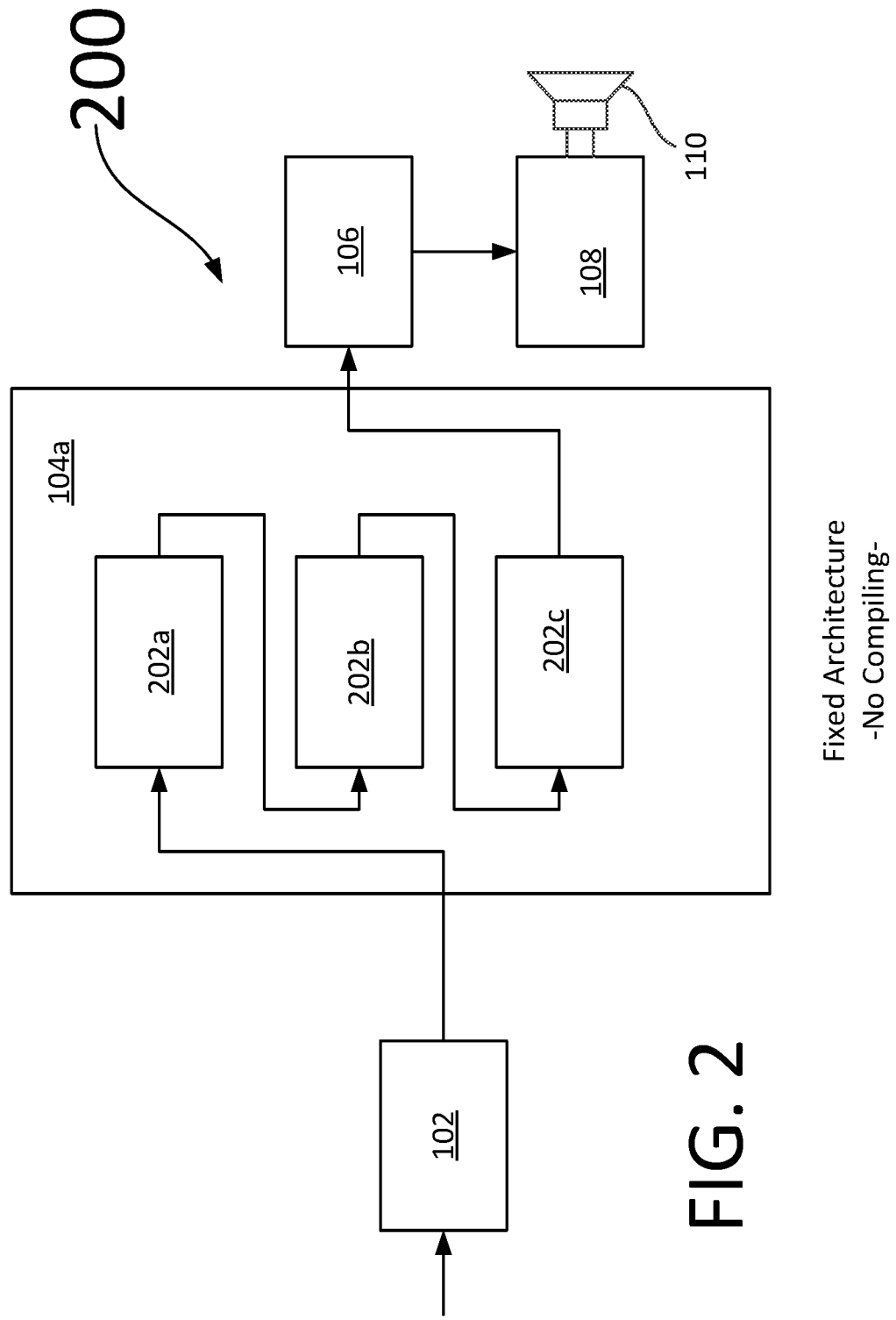
FIG. 2 illustrates a simplified interconnection block diagram of a fixed digital signal processor system.
Figure 3A:
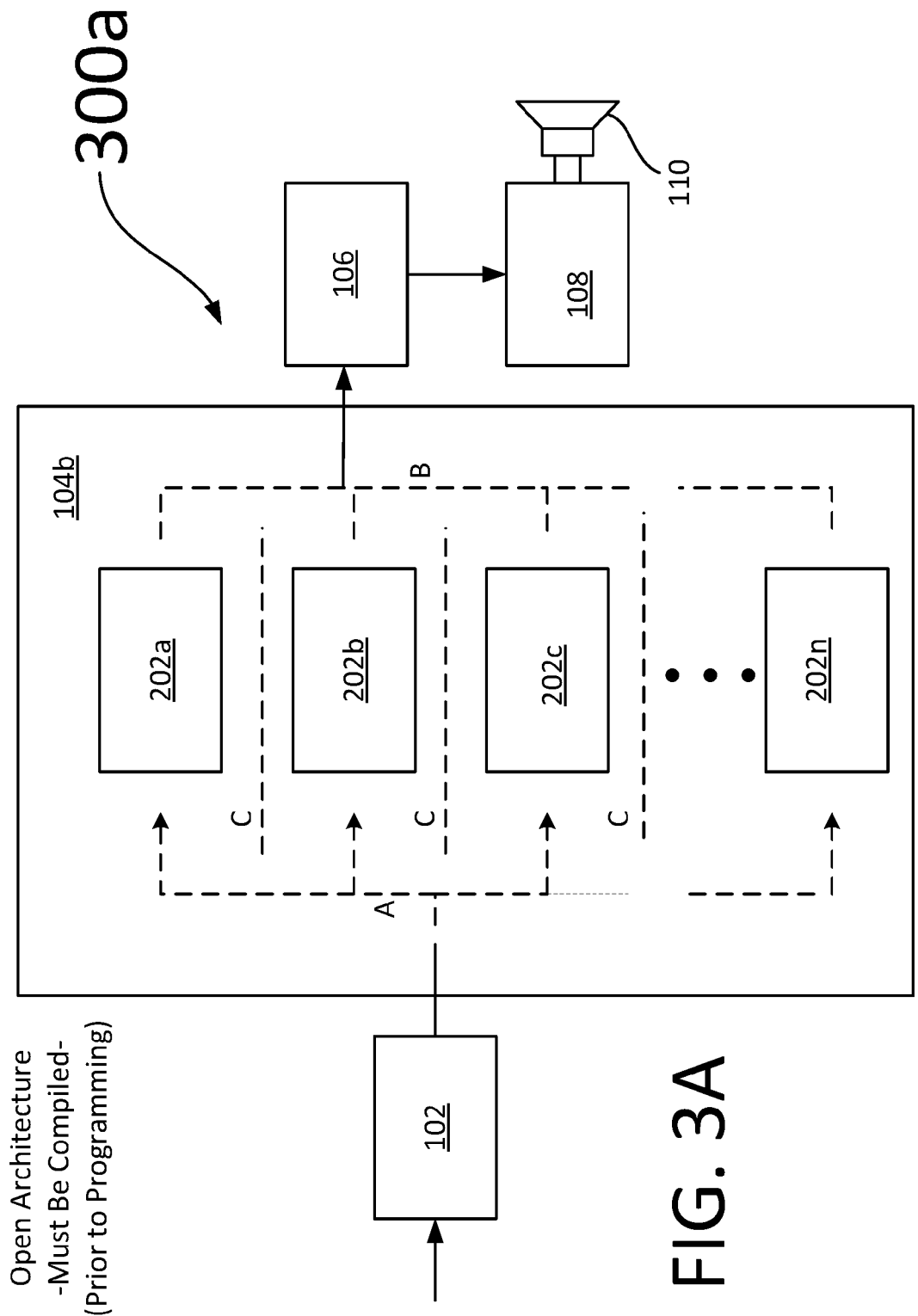
FIG. 3A illustrates an interconnection block diagram of an open digital signal processor system in which the digital signal processor has yet to be programmed and compiled.
Figure 3B:
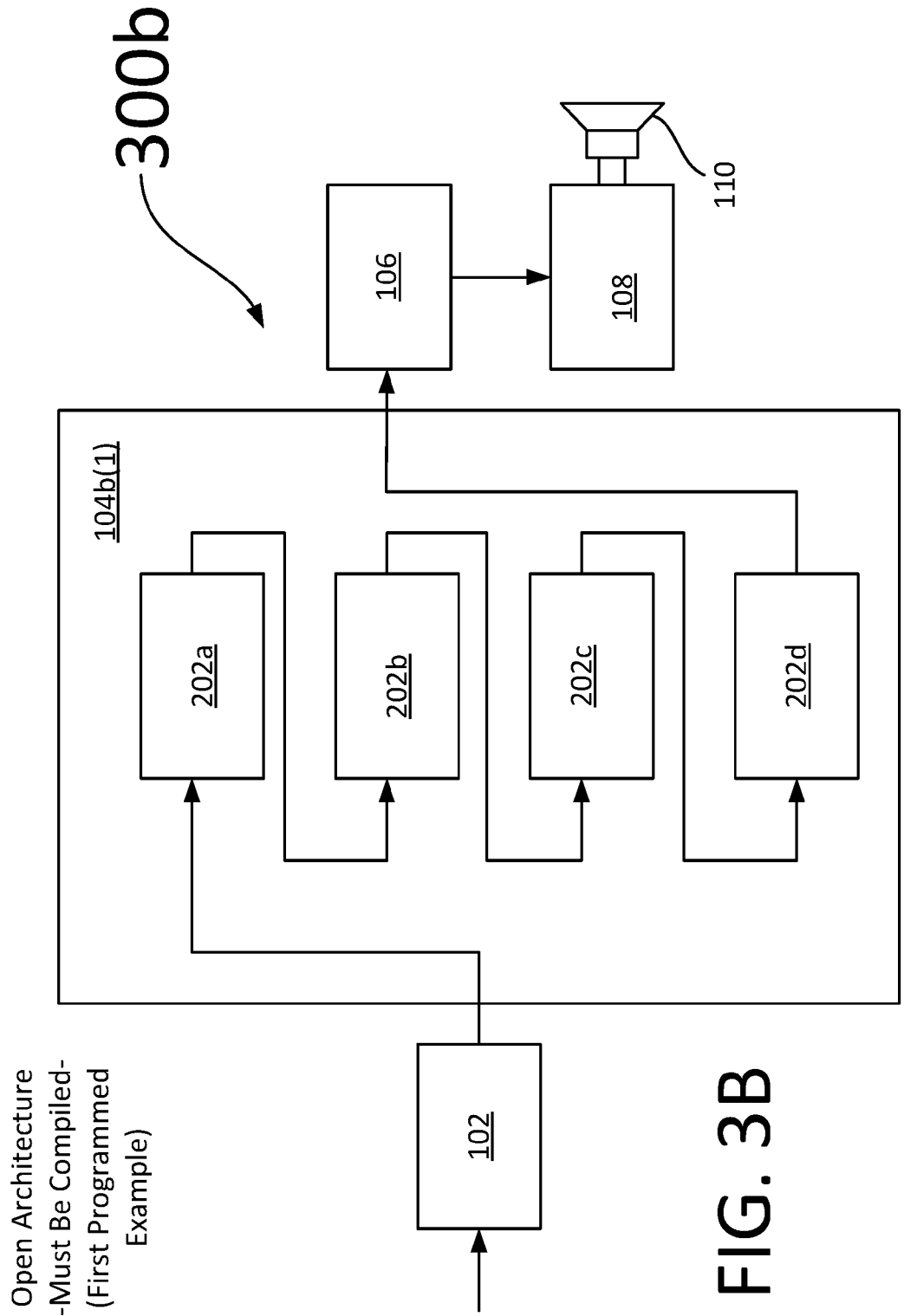
FIG. 3B illustrates a first simplified interconnection block diagram of an open digital signal processor system.
Figure 4:
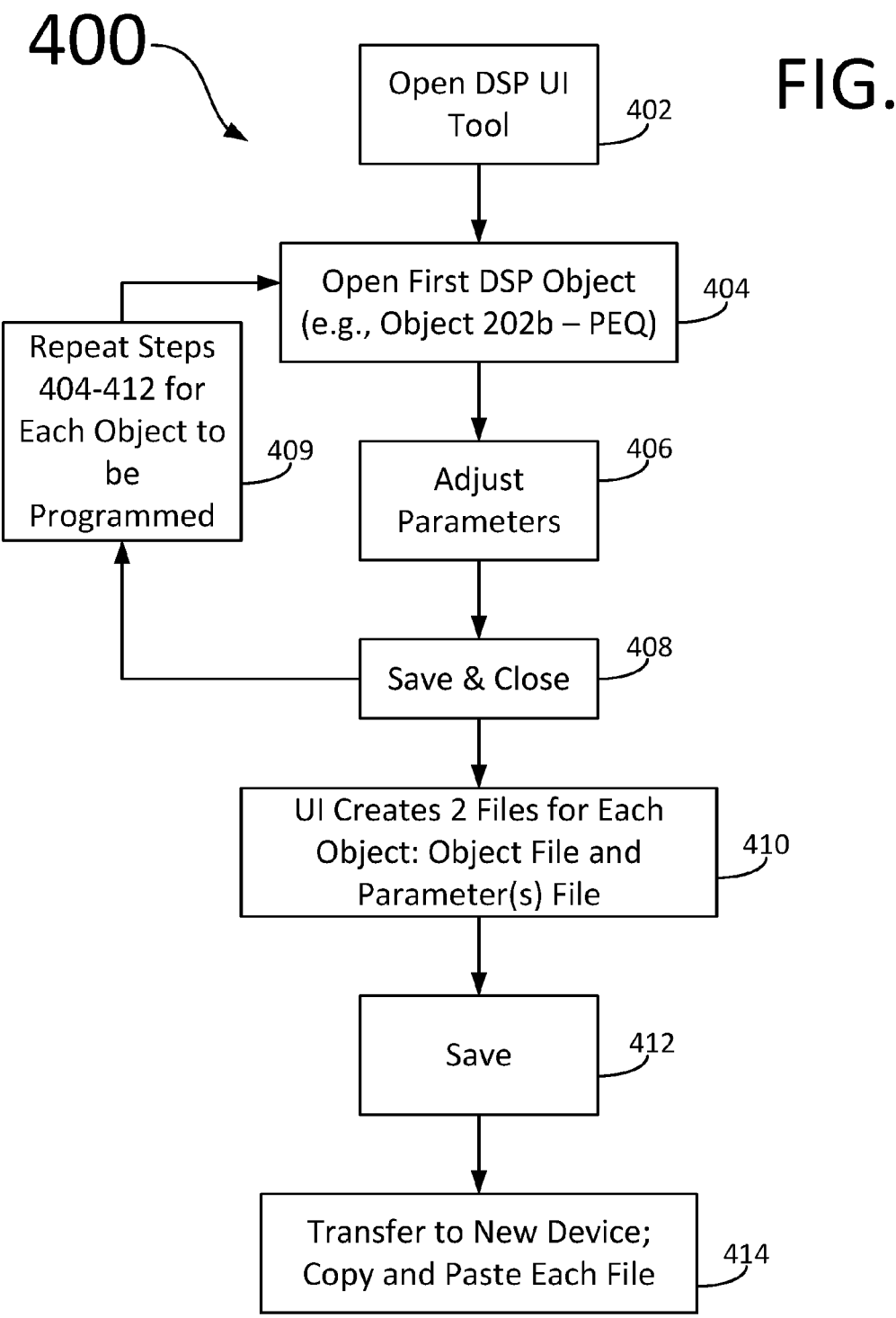
FIG. 4 illustrates a programming and file transfer process for different objects in existing digital signal processing systems.

The embodiments are described more fully hereinafter with reference to the accompanying drawings, in which embodiments of the aspects of the embodiments are shown. In the drawings, the size and relative sizes of layers and regions may be exaggerated for clarity. Like numbers refer to like elements throughout. The embodiments may, however, be embodied in many different forms and should not be construed as limited to the embodiments set forth herein. Rather, these embodiments are provided so that this disclosure will be thorough and complete, and will fully convey the scope of the aspects of the embodiments to those skilled in the art. The scope of the embodiments is therefore defined by the appended claims. The detailed description that follows is written from the point of view of a control systems company, so it is to be understood that generally the concepts discussed herein are applicable to various subsystems and not limited to only a particular controlled device or class of devices, such as audio processing products, which can include digital signal processors.

Reference throughout the specification to "one embodiment" or "an embodiment" means that a particular feature, structure, or characteristic described in connection with an embodiment is included in at least one embodiment of the embodiments. Thus, the appearance of the phrases "in one embodiment" on "in an embodiment" in various places throughout the specification is not necessarily referring to the same embodiment. Further, the particular feature, structures, or characteristics may be combined in any suitable manner in one or more embodiments.

LIST OF REFERENCE NUMBERS FOR THE ELEMENTS IN THE DRAWINGS IN NUMERICAL ORDER

The following is a list of the major elements in the drawings in numerical order.
100 Digital Signal Processing System
102 Analog to Digital Converter
104 Digital Signal Processor
106 Digital to Analog Converter
108 Amplifier
110 Speaker
200 Fixed Architecture DSP Audio System
202 Audio Object
300 Open Architecture DSP Audio System
400 File Transfer Process/Method
402-414 Method Steps of Method 400
500 Hybrid Digital Signal Processor (HDSP) Audio System
502 Hybrid Digital Signal Processor
600 HDSP Audio Object Programming Process/Method
602-614 Method Steps of Method 600
700 Extended Hybrid DSP Audio System
702 Touch Panel
704 Microphones
706 Audio/Video Switch
708 Coder-Decoder
710 Touch Display
712 Room Controller
714 Computer
802 First Device Graphical User Interface
804 Second Device Graphical User Interface
806 Intermediary Device Graphical User Interface
808 Audio Object File
810 Sub-Window
812 Save-As Button
814 Intermediary Device Storage
816 Second Device Storage
900 Method for Transferring and Converting Audio Object Files From a First Device to A Second Connected Device Through an Intermediary Device
902-910 Method Steps for Method 900
1000 Personal Computer/Laptop/Tablet/Personal Electronic Device (PED)/Server (PC)
1001 Shell/Box
1002 Integrated Display/Touch-Screen (laptop/tablet etc.)
1004 Internal Data/Command Bus (Bus)
1006 Processor Internal Memory
1008 Processor(s)
1010 Universal Serial Bus (USB) Port
1011 Ethernet Port
1012 Compact Disk (CD)/Digital Video Disk (DVD) Read/Write (RW) (CD/DVD/RW) Drive
1014 Floppy Diskette Drive
1016 Hard Disk Drive (HDD)
1018 Read-Only Memory (ROM)
1020 Random Access Memory (RAM)
1022 Video Graphics Array (VGA) Port or High Definition Multimedia Interface (HDMI)
1024 External Memory Storage Device
1026 External Display/Touch-Screen
1028 Keyboard
1030 Mouse
1032 Processor Board/PC Internal Memory (Internal Memory)
1034 Flash Drive Memory
1036 CD/DVD Diskettes
1038 Floppy Diskettes
1040 Executable Software Programming Code/Application (Application, or "App")
1042 Wi-Fi Transceiver
1044 BlueTooth (BT) Transceiver
1046 Near Field Communications (NFC) Transceiver
1048 Third Generation (3G), Fourth Generation (4G), Long Term Evolution (LTE) (3G/4G/LTE) Transceiver
1050 Communications Satellite/Global Positioning System (Satellite) Transceiver Device
1052 Antenna
1054 Internet
1056 Universal Serial Bus (USB) Cable
1058 Ethernet Cable (CATS)
1060 Scanner/Printer/Fax Machine

LIST OF ACRONYMS USED IN THE SPECIFICATION IN ALPHABETICAL ORDER

The following is a list of the acronyms used in the specification in alphabetical order.
3G Third Generation
4G Fourth Generation
ADC Analog-to-Digital Converter
AEC Acoustic Echo Cancellation
App Application
ASIC Application Specific Integrated Circuit
BIOS Basic Input/Output System
BPF Band Pass Filter
BT BlueTooth
CD Compact Disk
CODEC Coder-Decoder
CRT Cathode Ray Tubes
DAC Digital-to-Analog Converter
DM Digital Media
DSP Digital Signal Processor
DVD Digital Video/Versatile Disk
EAO Exchangeable Audio Object
EEPROM Electrically Erasable Programmable Read Only Memory
EQ (Graphic) Equalizer
FPGA Field Programmable Gate Array
GAN Global Area Network
GTE Gate
GUI Graphical User Interface
HDD Hard Disk Drive
HDMI High Definition Multimedia Interface
HDSP Hybrid DSP
HPF High Pass Filter
I/O Input/Output
IP Internet Protocol LCD Liquid Crystal Display
LED Light Emitting Diode Display
LPF Low Pass Filter
LTE Long Term Evolution
MODEM Modulator-Demodulator
NFC Near Field Communication
PC Personal Computer
PEQ Parametric Equalizer
RAM Random Access Memory
RAO Replacement Audio Object
RL Room Lync
ROM Read-only Memory
ROM Read Only Memory
RW Read/Write
SW Software
TS Touchscreen
UI User Interface
USB Universal Serial Bus
UVPROM Ultra-violet Erasable Programmable Read Only Memory
VGA Video Graphics Array The different aspects of the embodiments described herein pertain to the context of systems, methods, and modes for audio digital signal processors (DSPs) that incorporate a hybrid network architecture for processing graphical user images and other objects of DSP functionality, but is not limited thereto, except as may be set forth expressly in the appended claims.

For 40 years Creston Electronics Inc., has been the world's leading manufacturer of advanced control and automation systems, innovating technology to simplify and enhance modern lifestyles and businesses. Crestron designs, manufactures, and offers for sale integrated solutions to control audio, video, computer, and environmental systems. In addition, the devices and systems offered by Crestron streamlines technology, improving the quality of life in commercial buildings, universities, hotels, hospitals, and homes, among other locations. Accordingly, the systems, methods, and modes of the aspects of the embodiments described herein, as embodied as "Avis," or "DSP-128," among other names, can be manufactured by Crestron Electronics Inc., located in Rockleigh, N.J.

Figure 5:
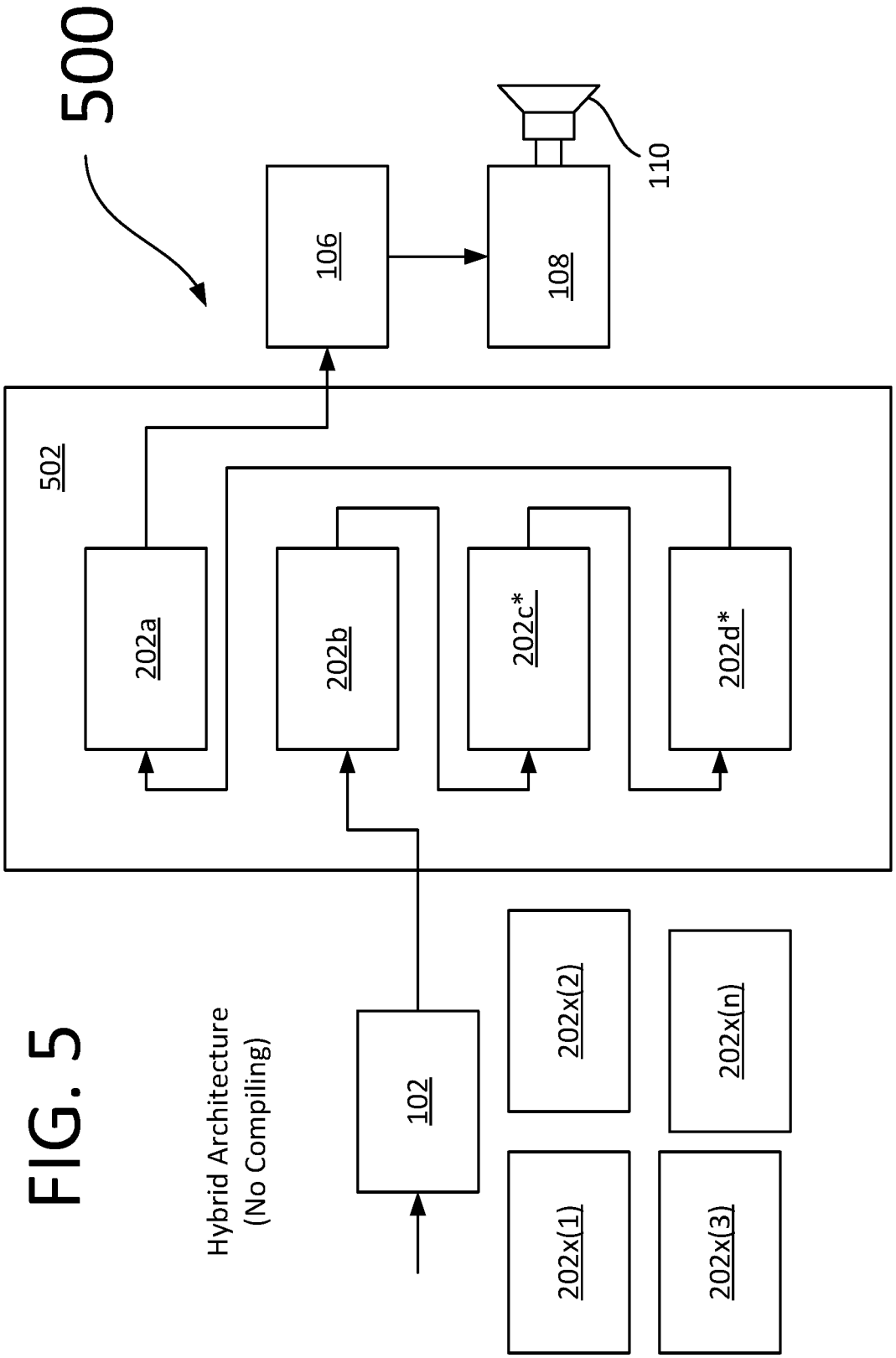
FIG. 5 illustrates an interconnection block diagram of a hybrid digital signal processor system that utilizes a hybrid digital signal processor that does not require compiling following programming according to aspects of the embodiments.

According to aspects of the embodiments, hybrid digital signal processor (HDSP) audio system 500, which is shown in FIG. 5, has been developed that employs a DSP utilizing a hybrid architecture that provides for easier programming of DSP functions of interchangeable audio objects 202 without the need for compiling. FIG. 5 illustrates an interconnection block diagram of HDSP audio system 500 that utilizes HDSP 502 that does not require compiling following programming of functions of audio objects 202 according to aspects of the embodiments.

HDSP 502 includes, as shown in FIG. 5, audio objects 202a,b, that have been previously shown and described in regard to FIGS. 2 and 3A-C; the nature and design and use of audio objects 202 themselves are substantially similar in regard to their use in HDSP 502, and therefore will not be described again in fulfillment of the dual purposes of clarity and brevity. In addition to audio objects 202a,b, there are audio objects 202c* and 202d*; audio objects 202c* and 202d* are substantially similar to that of audio objects 202a,b in terms of overall functionality. However, according to aspects of the embodiments, audio objects 202c* and 202d* can be exchanged for anyone of audio objects 202x(1)-(4). As those of skill in the art can appreciate, the exact number of exchangeable audio objects 202c* and 202d* can vary from design to design, and as such the number is not to be construed in a limiting manner.

According to aspects of the embodiments, HDSP 502 comprise a known, fixed number of audio objects 202 that have their inputs and outputs pre-arranged, but which include a smaller subset that can be interchanged that provides for greater flexibility in the design of the CS, yet does not necessitate compiling, thereby saving time, and money. According to aspects of the embodiments, HDSP 502 provides such flexibility and time saving features by making all of the audio objects 202—not only the ones that are permanently part of the channel strip, but also all of the exchangeable audio objects 202x(n)—part of the DSP setup program; therefore compiling does not need to be performed, even when the CS is initially set up. Even if different audio objects 202x(n) are exchanged, the DSP program only needs to save the new function parameters without compiling. Eliminating compiling processes any time a replacement audio object (RAO) is exchanged for an existing exchangeable audio object (EAO) saves a significant amount of time.

According to further aspects of the embodiments, a hybrid UI that can be used with RAOs and EAOs is designed to be integrated with Crestron control and touch panel design, and seamlessly integrate with VisionTools Pro-e (VT Pro-e). VT Pro-e is comprehensive touch screen graphical user interface (GUI) design software for use by authorized Crestron system programmers. This easy-to-use software provides support for and interacts with numerous Crestron products. For the ultimate control system programming solution, VT Pro-e and SIMPL team up to provide programmers with exceptional design capabilities and extensive programming power. Using VT Pro-e, programmers can create GUIs for touch screens, the Crestron App, and XPanel. The software is also used to configure Crestron keypads and remotes and provides support for legacy touch screens.

In addition, another advantage of the hybrid UI is the ability to set up channel strips for one particular piece of equipment, and the save it, and re-use it on other, similar equipment. According to aspects of the embodiments, compiling is not necessary, even when the hybrid DSP program is saved, and then transferred for use with a different piece of audio equipment or different system altogether.

An example of how this can be used is as follows. Using the hybrid UI, a designer can create a set of DSP functions or controls. This is saved as a ".dsx" file on the PC/laptop/or other "smart" device on which the hybrid UI resides. The designer then exports/imports the ".dsx" file to the VT Pro page of the device to which the DSP functions will be applied; typically, this can be a touch panel of some sort. VT Pro converts the same to a ".vtz" file that can be used and displayed by the device. The programmed DSP functions can now be accessed by the user of the touch panel.

A further example can be the setup of channel strips for Crestron's Saros speakers. In this case, the user might want to add more gain in an equalizer DSP block for a set of frequencies in the low end of the audio frequency spectrum); the user can save this file and re-use it whenever they have the same type of Saros speakers. The user can create a repository of CSs for repeated use. Numerous CSs can be set up, and can be saved. Every time the strip is implemented it will have the same parameters.

CSs correlate to input/outputs. Example: a Crestron DSP 1280 has 12 analog inputs, 8 auxiliary inputs, and 8 analog outputs. In addition, there are digital inputs (Dante), and the auxiliary inputs do not have to be tied to the outside world, but can be tied to the output of one or more analog input CSs.

There are other features as well. Use of the hybrid UI provides for a relatively quick acoustic set up as speaker profiles are included as custom channel strips and a spectrum display is provided based on the speaker profile. Custom channel strips are also provided for popular microphones. A spectrum analyzer can be overlaid on top of the equalizer tool. Any of the multiple inputs can be analyzed. The combination of spectrum analyzer and equalizer tool can be used to "tune" the room in which the DSP is being used, or to find feedback frequencies. Use of these tools provides a user of the hybrid UI to get within a few dB of a tuned room in a short period of time.

Auxiliary CSs provide additional processing opportunities. For example, a user can implement and extra delay, additional filtering, and just about any other DSP function block. In the CSs there is a difference in terms of the maximum number of DSP audio blocks 202 that can be accommodated in each CS depending on the type of CS.

In the first type, Non-Acoustic Echo Cancellation (AEC) models, there are five audio blocks 202 per analog CSs, and for the second type, there are six audio blocks 202 per CS (the sixth being the AEC). In addition, auxiliary CSs always have four audio blocks 202. As those of skill in the art of can appreciate, the number of audio blocks 202 per CS can vary from use to use, depending on several different factors. The examples listed herein are not to be taking in a limiting manner, as they have been provided and discussed for the purposes of illustration only.

According to aspects of the embodiments of the hybrid architecture, each audio block 202 of the CS has a set of parameters that can be changed. In the open architecture, whenever there is the slightest change (e.g., a change of one parameter of one function of one audio object 202), the entire program needs to be re-compiled and re-loaded. This does not occur with HDSP 502 according to aspects of the embodiments, regardless of how many parameters are changed, nor if exchangeable audio objects have been replaced with replacement audio objects. As briefly mentioned above, HDSP 502 is relatively easier to use than open architecture DSP 104b, but still provides for a good level of customization.

The ease of use of HDSP 502 can be illustrated by a simple programming example. If there were 100 huddle rooms in a facility, it would be relatively easy to setup all the huddle rooms if each room had an identical or at least a substantially identical acoustic footprint or characteristic. However, such is generally not the case, even when substantially identical equipment is used in all of the rooms. Use of the HDSP 502, however, allows a user to quickly and easily setup each room without the need for re-compiling for minor parameter changes from room to room.

Devices that use the hybrid UI and include HDSP 502 can also use Dante, which is an industry standard for input/output expansion. A Dante controller is integrated into the hybrid UI and HDSP 502; Dante can control 256 channels of high quality audio using the internet protocol (IP). The Dante controller manages the connections between and amongst all of the Dante transmitters and receivers in the DSP device/system. Dante provides the ability to expand the I/O among additional DSPs, amplifiers, and third party vendors.

The hybrid UI is fully integrated with virtually all of Crestron's audio products, including amplifiers, Room Lync (RL), Digital Media (DM), speakers, and Fusion, among others. There are many audio signal processing features that can be implemented in the hybrid UI. These include Auto-update and Fault Logging; Activity Log to the Cloud to track all of the DSP control changes; Spectrum Analyzer to verify system operation and acoustic environment; and Recorded Voice files, for system test and verification, among others.

According to further aspects of the embodiments, there are a number of DSP audio objects 202 for use in the hybrid UI. One such audio object 202 is gain. Gain is defined as the factor by which the output magnitude is different from the input magnitude. If the input magnitude is the same as the output magnitude at a given frequency, the filter is said to have "unity gain." Another such audio object 202 is acoustic echo cancellation (AEC). AEC is a method to improve voice quality by preventing echo from being created, or removing it after it is already present. In addition to improving subjective quality, this process increases the capacity achieved through silence suppression by preventing echo from traveling across a network. Another such audio object 202 is a graphic equalizer (EQ). An EQ is a device that enables a user to raise or lower the gain of audio signals in a particular frequency range, thereby improving the final sound output to a sound system. Equalizers can be further delineated as fully parametric ("PEQ" (parametric equalizer)), and semi-parametric equalizers. In a fully parametric equalizer, the user can define the gain of the filter band, the center frequency of the filter band, and the bandwidth of the band of the filter band. In fully parametric equalizers, the "Q" parameter is defined as the ratio of the center frequency ($F_C$) to the bandwidth (BW): ($Q=F_C/BW$). Typically, there should be at least some overlap in the bands. In a semi-parametric equalizer, the user only has control over the gain of the predefined bands and the center frequency of the bands. The bandwidth and Q factor are kept constant.

Another such audio object 202 is a limiter. A limiter is a compressor with a high ratio, and generally, a fast attack time. Limiters are common as a safety device in live sound and broadcast applications to prevent sudden volume peaks from occurring. Another such audio object 202 is a compressor. A compressor is a device that reduces, or compresses, the level of signals that exceed a certain threshold, while leaving lower level signals unaffected. This reduces the dynamic range of the audio signal. Compressors and limiters help audio devices avoid clipping.

Another such audio object 202 is a delay. Delay is defined as the computational delay of a block or subsystem, and is related to the number of operations involved in executing that block or subsystem in a DSP system. Another such audio object 202 is a noise gate. A noise gate is an electronic device or software logic that is used to control the volume of an audio signal. In its most simple form, a noise gate allows a signal to pass through only when it is above a set threshold: the gate is open. If the signal falls below the threshold no signal is allowed to pass: the gate is closed. A noise gate does not remove noise from the signal. When the gate is open both the signal and the noise will pass through. Band-limited noise gates are also used to eliminate background noise from audio recordings by eliminating frequency bands that contain only static. A noise gate is used when the level of the 'signal' is above the level of the 'noise'. The threshold is set above the level of the 'noise' and so when there is no 'signal' the gate is closed. Noise gates often implement hysteresis, that is, they have two thresholds. One to open the gate and another, set a few dB below, to close the gate. This means that once a signal has dropped below the close threshold, it has to rise to the open threshold for the gate to open, so that a signal that crosses over the close threshold regularly does not open the gate and cause chattering. A longer hold time as described above also helps avoid chattering.

Another such audio object 202 is a matrix mixer. A matrix mixer is a device that routes multiple input audio signals to multiple outputs. It usually employs level controls, such as potentiometers, to determine how much of each input is going to each output, and it can incorporate simple on/off assignment buttons. The number of individual controls is at least the number of inputs multiplied by the number of outputs. Matrix mixers may be incorporated into larger devices such as mixing consoles or they may be a standalone product. They always have routing and level controls and may also include other features. Matrix mixers are often used in a complex listening space to send audio signals to different loudspeaker zones. They may be used to provide the producer or director different blends of a mixing project for television, film or recording studio.

Another such audio object 202 is an automixer. An automixer is a live sound mixing device that automatically reduces the strength of a microphone's audio signal when it is not being used. Automixers lower the hiss, rumble, reverberation and other extraneous noise that occur when several microphones operate simultaneously. They can also be used to mix sound from non-microphone signals such as playback devices.

Another such audio object 202 is automatic gain control (AGC). AGC_is an audio block that adaptively adjusts its gain to achieve a constant signal level at the output.

Another such audio object 202 is crossover circuit. A crossover circuit is a circuit or device that divides the signal output from the power amplifier into different frequency bands for the different drivers—woofer, midrange, and tweeter—for example. In HDSP 502, different frequency bands are separated digitally. Each band can then be amplified or attenuated, or further processed as desired.

Another such audio object 202 is spectrum analyzer (SA). A spectrum analyzer displays signal information such as voltage, power, period, wave shape, sidebands, and frequency. They can provide you with a clear and precise window into the frequency spectrum. Another such audio object 202 are filter. Filters are typically generated in the forms of a low pass filter (LPF), high pass filter (HPF), band pass filter (BPF), notch filter, and parametric equalization, among other types.

Another such audio object 202 is ducking. Ducking is the process of lowering the output of one channel as another is raised. In ducking, the level of one audio signal is reduced by the presence of another signal. In radio this can typically be achieved by lowering (ducking) the volume of a secondary audio track when the primary track starts, and lifting the volume again when the primary track is finished. A typical use of this effect in a daily radio production routine is for creating a voice-over: a foreign language original sound is dubbed (and ducked) by a professional speaker reading the translation. Ducking becomes active as soon as the translation starts. In music, the ducking effect is applied in more sophisticated ways where a signal's volume is delicately lowered by another signal's presence. Ducking here works through the use of a "side chain" gate. In other words, one track is made quieter (the ducked track) whenever another (the ducking track) gets louder. This may be done with a gate with its ducking function engaged or by a dedicated ducker.

According to aspects of the embodiments, there are many functions that can be implemented in a hybrid UI for use with HDSP 502 in hybrid DSP system 500. Several of these are described below. For example a preset can be applied by right clicking on a button and selecting "Apply." This changes all objects in the preset to have their parameters reflect those stored in the preset. A Preset page exists in which where presets can be made and used. Presets allow for quick recall of commonly used changes and settings. Control-clicking on audio objects 202 and other elements in hybrid UI can highlight them, which indicates that they are selected. Clicking a "New" button can then create a preset with all of the selected objects with their current parameters and state. A drop-down arrow can appear that can then be clicked on, and the preset can be expanded and its member objects listed.

An audio object 202 in a preset can be expanded, and each parameter of that audio object 202 can then be viewed. By selecting an "Edit" feature, presets can be edited and changed. Changes can easily be made by selecting parameters of objects listed under the preset and changing their values. Presets can also be renamed and deleted as needed.

Sections can also be collapsed and expanded to provide more focus in the viewing space of a Tool button. This is done by selecting or deselecting the options by the top right of the Tool button next to the Zoom buttons.

Channel names can also be added in a Signal page to give additional information and clarity to a project. The view for these can be toggled by a "Channel Names" button that can be located near the top right of the Tool button.

Matrix cross-points can be set to route signal from inputs to outputs at an adjustable level. Auxiliary channels are internal channels that can similarly be routed to and from. They are used to provide additional processing and mixing that cannot be achieved with just the analog inputs and outputs alone.

Mentioned above was the Signal page. From here, the various DSP objects on each channel strip and the matrix cross points can be edited to route signals and perform the desired signal processing. Once saved, views can be recalled on the Signal page by selecting the desired view under a "Custom Views" drop-down menu.

An internal signal generator can be implemented and used to generate a tone or noise according to aspects of the embodiments. The generated tone can then be routed to one of the reference outputs to do basic spectrum analysis. A spectrum analyzer can be viewed by opening an EQ object and selecting an arrow on the top right of it to expand a wing with the spectrum analyzer options. There are several functions available with the spectrum analyzer. For example, a "Start/Stop" button toggles the spectrum analyzer on/off. "Smoothing" sets the octave smoothing. "Decay" sets how fast the spectrum decays down to its base level. "Window" sets which window function is used to view the spectrum. "Reference" selects which reference is used for the analysis. Other buttons can be implemented that include a "Level" slider and "On/Off," which are the "Level" slider and "On/Off" functions for the signal generator.

According to aspects of the embodiments, the signal generator and spectrum analyzer provide for room tuning. Pink noise can be generated with the signal generator and routed to a speaker attached to an analog output. A microphone located in the room can then pick up the pink noise audio signal, and read back at an analog input. Following digitization, the mic's output is then routed to a reference channel and the spectrum analyzer. The spectrum output will show the response of the speaker within the room to provide a view of the audio environment. Filters in the EQ can then be adjusted to change the spectrum to tune the room. As those of skill in the art can appreciate, tuning involves flattening the spectral response of the acoustic system to eliminate any outstanding spikes or notches that might be present. The hybrid UI program can interpret the output of the spectrum analyzer to find spectral peaks or valleys and provided recommended settings to tune the room to achieve a substantially flat response.

In the hybrid UI a Strip Edit page has been provided wherein the channel strips can be programmed. The channel strips can be customized to suit a vast variety of needs and designs. Audio objects 202 used in the channel strip can be changed by dragging the desired audio object 202 and dropping it into the like-colored slot of the channel strip. The availability of some audio objects 202 vary between the analog input, analog output, and auxiliary channels. An AEC audio object 202 is also present on models that support AEC functionality.

Objects can be opened and edited, as described above, so that their parameters can be changed and stored so that when the strip is implemented, the adjusted parameters are brought along with the channel strip. Channel strips can be named, and this functionality is also provided on the Strip Edit page. Channel strips can also provide audio in either mono or stereo form. Stereo channel strips function substantially similar to their mono equivalents, except that they control a stereo pair of channels instead of just one. Once edited, channel strips can be saved to a file as well, for later use.

In addition, an interface page has been created that provides an overview of hybrid DSP system 500. VU meters have been provided that allow a user to quickly ascertain where a signal is present, and if any inputs and outputs are clipping. The matrix will show if cross-points have been muted, or made active to give a general view of the signal routing. There are also a few other higher-level operations available for loading/saving projects. Different pages allow for different functions of DSP programming, workflow, and use.

Projects can also be loaded on either the System page or from a File option on the toolbar at the top of the hybrid UI. Loading projects sets all channel names, strip objects, object parameters, matrix routing, views, and presets of the DSP and Tool session as the ones saved in the project file. Project files can be saved from either the System page, or the File option on a toolbar located at the top of the hybrid UI. Saved project files can include all channel names, strip objects, object parameters, matrix routing, views, and presets.

Furthermore, provisions have been made for virtual DSPs that can also be added to the hybrid UI. Virtual DSPs allow for setting up and designing a DSP layout without being connected to a physical device. This is useful for offline development. Project files and channel strips can be created here and then later loaded, imported, and applied to a physical DSP to program it.

A UI Export page can be used to export objects from the hybrid UI to a file that can be read by VT Pro. This feature allows for fast and easy programming of DSPs in larger systems. "Control-click" can be used to select an audio object 202 and drag and drop them into space on the left of the hybrid UI to export them. A window can be provided that labels an audio object 202 that can be carried over to VT Pro. By selecting an audio object 202 from the channel strip, only the bare features such as "Mute," and "Bypass," are brought into the export.

A Signal Flow page has also been provided on the hybrid UI. On the Signal Flow Page, the user can open and adjust a particular DSP audio object 202 (e.g., "Gain," "PEQ," "CMP," "DLY," and "GTE," among others), that can be part of a channel strip. For each of the different DSP audio objects 202, the user can adjust object parameters (examples of such parameters can include the gain of a channel, the bandwidth of a notch or bandpass filter, among many other parameters).

A Views page has also been provided in the hybrid UI. The Views Page illustrates a view of different GUIs of audio objects 202 of a selected CS. From the Views Page, a user can obtain and view previous arrangements of open audio objects 202 by simply clicking on a different channel strip. Using the Views page facilitates workflow because a user can quickly see what the settings are for a particular channel strip. The user scan quickly determine the settings of a particular channel strip and then, if desired, the user can cut and paste those settings to one or more other channel strips.

Channel strips can be programmed by clicking on an audio object 202 within the channel strip, and then the parameters can be adjusted as desired (and as described herein). If an audio object 202 is not adjusted, then it is as if the audio object 202 is not included in the channel strip. The channel strip can then be applied to an output by adjusting the corresponding gain on the desired output. The preset levels for gains between a particular channel strip and output is −80 dB, which effectively means that any input present at the input will have no affect at all on the output signal. To apply a channel strip to an output, the user can click on a desired analog output, and an analog output gain window will open. The gain can then be adjusted. Channel strips, once defined, can be saved and reused for different devices or uses. When reused in this manner, they can be further edited, modified, and managed (meaning exported for use in different devices such as a touch panel device, or a different DSP, or stored in some other location, among other actions).

A Presets page has also been provided in the hybrid UI. In the Presets page, the user can drag and drop DSP controls to a preset collection. A user can set a preset that mutes all of the microphones at a conference room table, or can set a preset that unmutes all of the microphones at the conference room table, or can set a preset that selectively mutes all of the microphones but one, or any other configuration of speaker/microphone settings. In addition, presets can be exported.

A UI Export page has also been provided (or "Control Exports" page). When using the UI Exports function, the user can drag any DSP control to another location, and export it as a UI file. In addition, this is the GUI that allows users to export the files to VTPro-e for Touch Panel design and integration.

Figure 6:
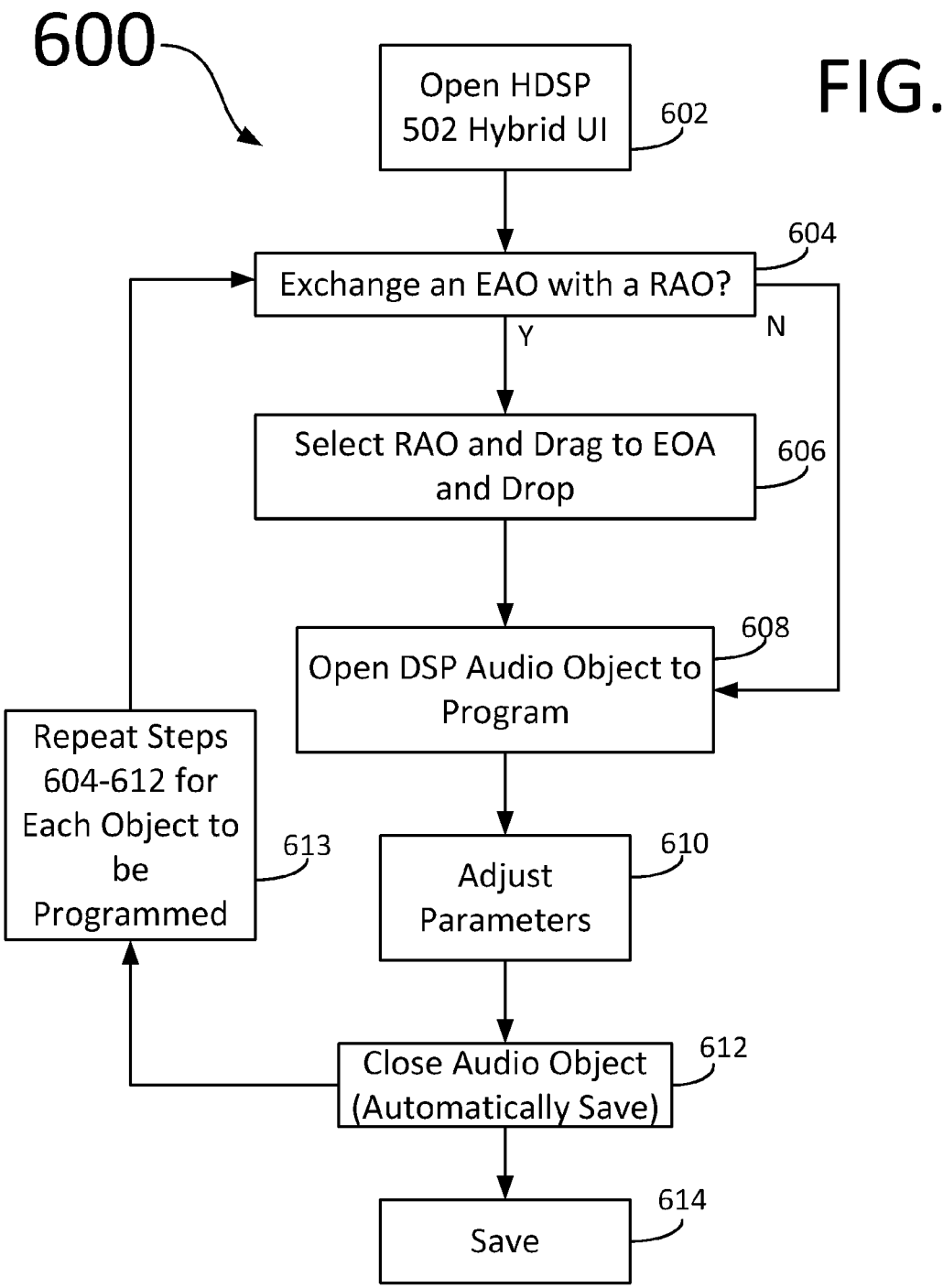
FIG. 6 illustrates a programming process for a hybrid digital signal processor according to aspects of the embodiments.

FIG. 6 illustrates HDSP audio object programming process/method (method) 600 for HDSP 502 according to aspects of the embodiments. Method 600 begins with step 602 in which a user opens the hybrid UI, and in decision step 604, the user determines whether or not to exchange an exchangeable audio object (EAO; e.g., referring to FIG. 5, the exchangeable audio objects are 202$c$* and 202$d$* (although, as those of skill in the art can appreciate, the number of exchangeable audio objects can vary)) with a replacement audio object (RAO; e.g., referring to FIG. 5, the replacement audio objects are 202$x(n)$, wherein "n" ranges between one and m−1, wherein "m" is the total number of audio objects). As those of skill in the art can appreciate, the determination of whether or not to replace an EAO with an RAO does not necessarily need to be accomplished at this point in the programming process; as such, the decision to exchange and EAO with an RAO can be done prior to any programming of parameters of the functions of the audio objects 202, or could be done after the second of five, or all of them, and therefore could be accomplished after all of the other audio objects 202 have been programmed.

If the user decides to exchange an EAO with an RAO, then in method step 606 ("Yes" path from decision step 604), the user selects an RAO and drags onto the EAO, and drops it there; the two change places, and the user can then select the same or a different audio object 202 to program in method step 608. In method step 610 the user programs the selected audio object 202 (adjust parameters), and in step 612, the user closes selected and now programmed audio object 202. In method step 613, method steps 604-612 are repeated for any/all audio object 202 that will be programmed, until no additional audio objects 202 need and/or are desired to be programmed remain. Then, method 600 proceeds to step 614 and the program is closed, which automatically saves the program.

If, instead of choosing to exchange an EAO with an RAO in decision step 604 the user decides to just program other audio objects 202, method 600 and the user follow the "No" path ("N") from decision step 604, and proceeds to step 608.

Figure 7:
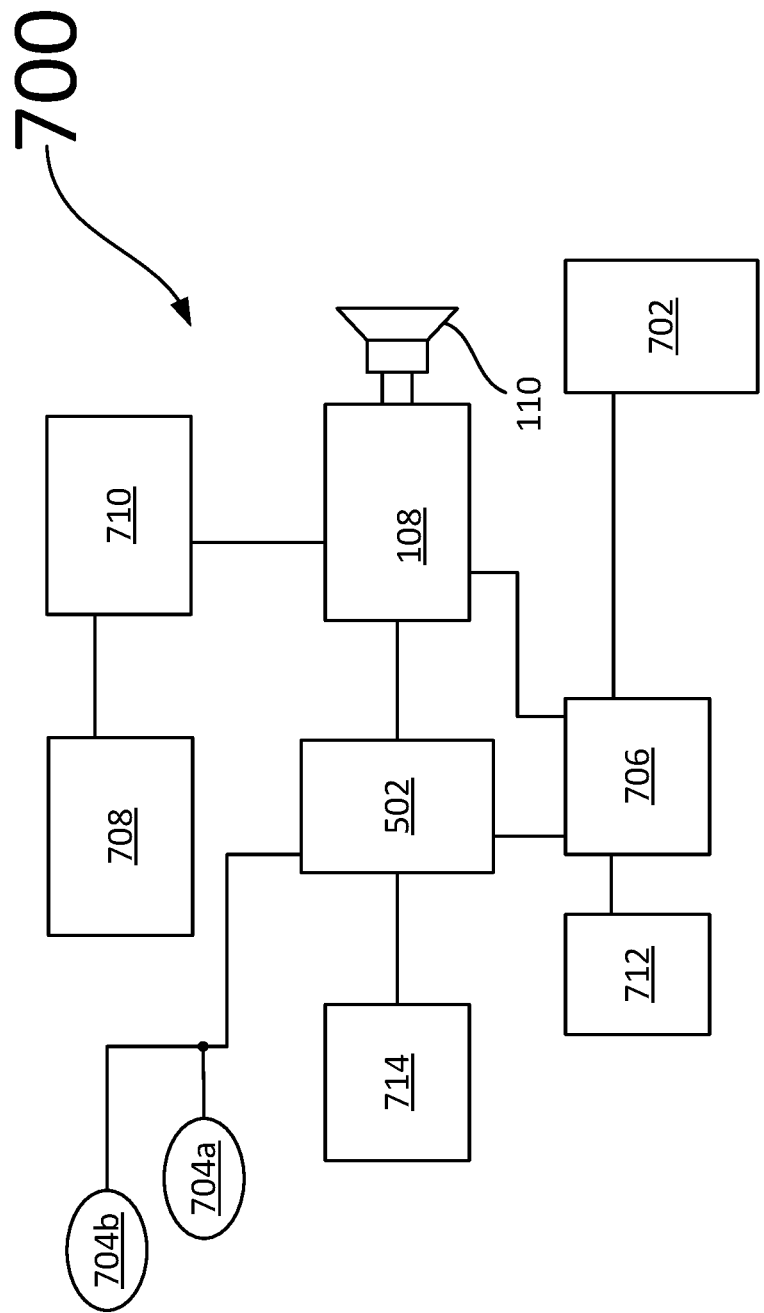
FIG. 7 illustrates a more detailed view of HDSP audio system 500 shown in FIG. 5 with additional components according to the aspects of the embodiments.

FIG. 7 illustrates a more detailed view of HDSP system 500 shown in FIG. 5 with additional components according to the aspects of the embodiments. In extended hybrid DSP audio system 700 of FIG. 7, there are several speakers 110, touch panel 702 (that can be used to store the DSP program), amplifier 108 (e.g., Crestron product AMP 8000), HDSP 502 (Crestron's DSP 1283), table microphones 704a,b, audio/video switch 706, coder-decoder (CODEC) 708 (used for stereo reproduction, amplification, among other uses), touch display 710, in-wall speakers 102, room controller 712 (e.g. Crestron's RMC3), and a computer 714 (which can store music and/or other audio files). Such audio system 700 could be installed and used at enterprise locations such as corporate meeting and board rooms, government facilities, private residences, and the like.

Figure 8:
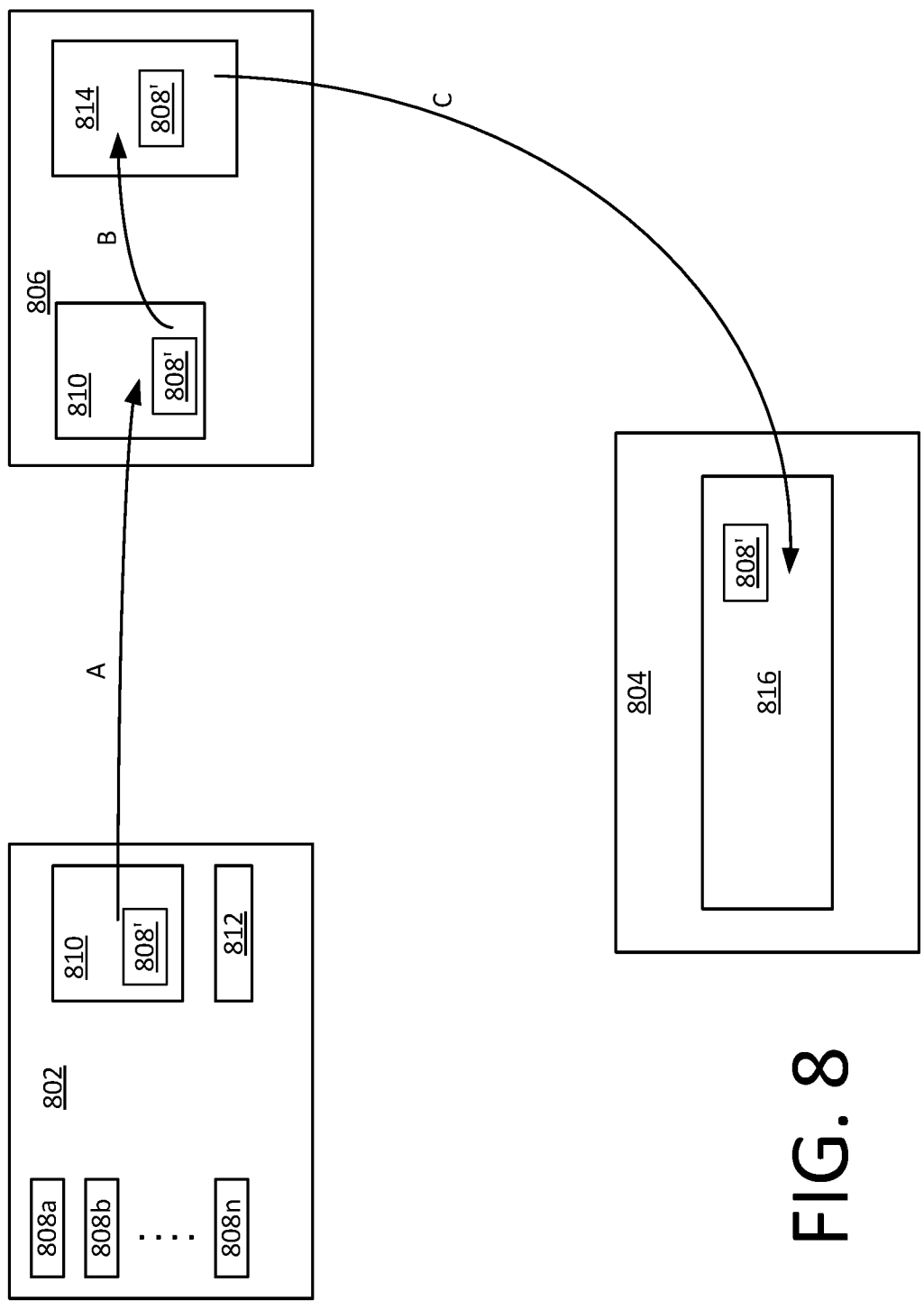
FIG. 8 illustrates several graphical user interfaces used in the transfer and conversion of audio object files from a first device to a second device through a third device.
Figure 9:
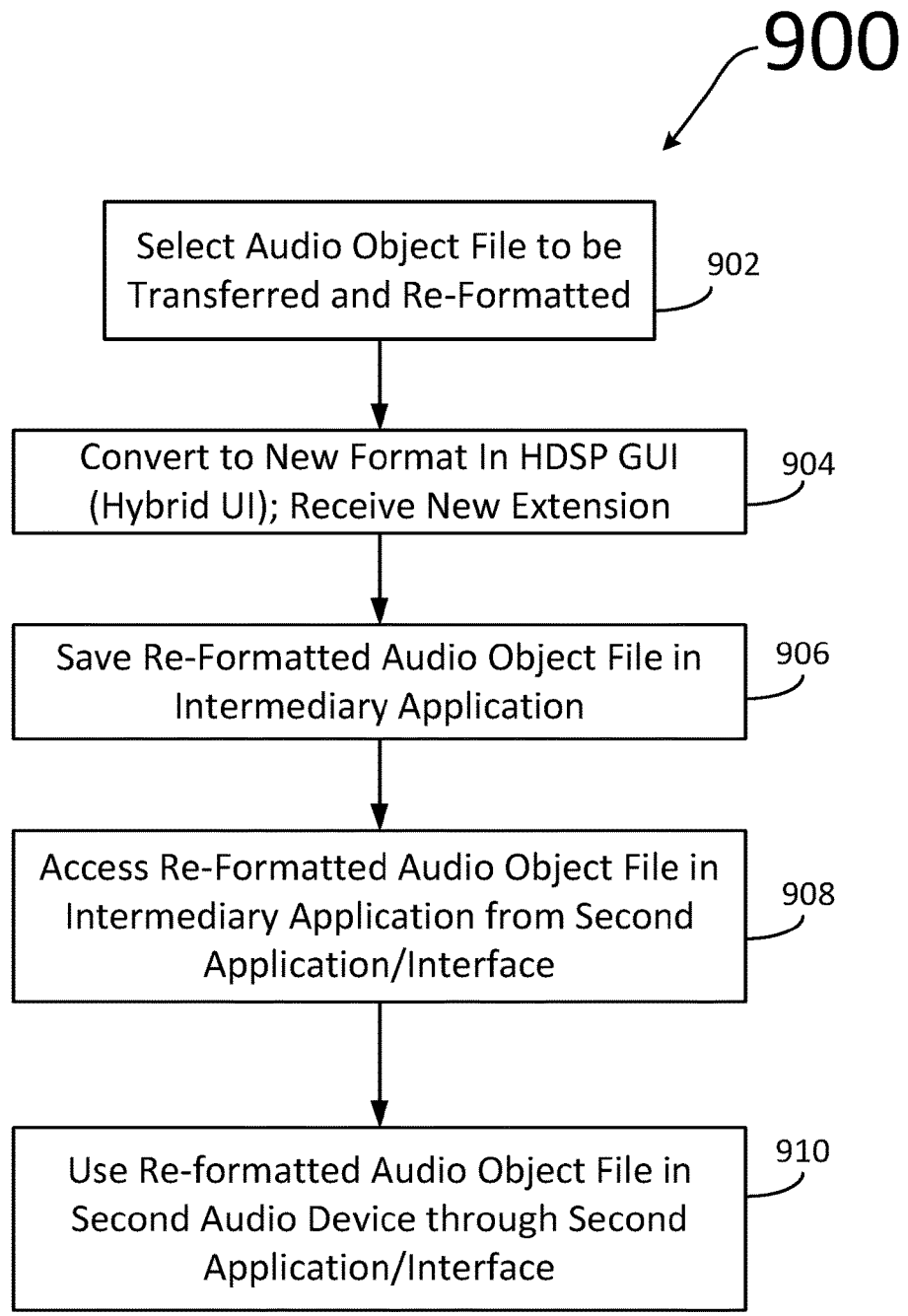
FIG. 9 illustrates a method for transferring and converting audio object files from first device to second connected device through an intermediary device according to aspects of the embodiments.

FIG. 8 illustrates several graphical user interfaces 802, 804, 806 used in the transfer and conversion of audio object files 808 from a first device to a second device through a third device, and FIG. 9 illustrates method 900 for transferring and converting audio object files from first device 902 to second connected device 904 through intermediary device 906 according to aspects of the embodiments. When a user opens a hybrid DSP audio object 202 window, a plurality of previously created DSP audio objects 202 will be available for use to program a new device; these are audio object files 808a,b,n. Audio objects files 808 (with the extension ".dbx") can be dragged and dropped into a separate sub-window (that correlates to a separate file space) 810 (arrow A). Once all of the expected controls are dragged into the separate sub-window, the user can click on save-as button 812, giving those files a new file name, with a ".vtz" extension; these files can now be referred to as modified audio object files 808'. Intermediary device, which can be a VT Pro-e enabled device, represented by GUI 806, can then access that file to program the new device (in this case, a touch screen (TS) device,).

The user then opens intermediary device, represented by GUI 806, and accesses modified audio object file 808' and saves it in intermediary storage 814 (arrow B), which is the correct TS location for the new project. VT Pro-e is a Crestron software product that can be used to design Touch Panels, TS's and other devices. The user of second device, as represented by GUI 804, can then access modified audio object file 808' and move it into second device storage 816 (arrow C), for use when necessary. According to aspects of the embodiments, the process can reduce about two days of work to about two hours of work.

Referring now to FIG. 9, there is shown method 900 for transferring and converting audio object files from first device 802 to second connected device 804 through intermediary device 806 according to aspects of the embodiments.

Aspects of the embodiments are directed towards a method for processing previously programmed DSP objects, which embody smaller functions of DSP architecture, to be easily combined and transferred to other devices through use of specific Crestron provided software. Method 900 begins with method step 902 in which a user selects one or more audio object files 808 to be transferred and re-formatted; according to aspects of the embodiments, the first format can be a format for use with HDSP 502 within DSP system 500, and the extension in this case is .dbx. According to further aspects of the embodiments, the second format can be that as recognized and used in the second connected device 804, wherein the file name extension can be .vtz. In method step 904, the one or more selected audio object files 808 can be converted from the first format to the second format, and stored in a file location. In method step 906, each of the one or more re-formatted audio object files is saved in intermediary device storage 814, accessible by application 806. In method step 908, second application 804 can access each of the one or more reformatted (or modified) audio object files 808', and in method step 910, the modified audio object file 808' can be used by the second audio device and second application 804.

In the hybrid UI, buttons can be provided that allow for parts of the window to be expanded or contracted. The different input and output sections can be collapsed and expanded.

According to further aspects of the embodiments, multiple DSP audio objects that have been previously used separately can be combined into one DSP object. That is, previously, a DSP system would include a gate algorithm, ducker algorithm, and an auto-mixer algorithm as separate audio objects 202. These aspects of the embodiments combine the three into one, and achieves better results than the three separately.

Room equalization is the process of being able to "tune" the room to make speakers sound good. The goal is to give the room a "flat response," i.e., no bumps, dips, peaks, valleys, etc., in the spectrum/frequency response of the room. Ideally, the frequency response of a room should be flat. In order to obtain a flat response, a "pink noise" generator can be used to output a signal that ranges from about 20 Hz to about 20 KHz, and then equalization can be implemented to achieve a flat or substantially flat response. As those of skill in the art can appreciate, in pink noise the spectrum is inversely proportional to its frequency. As the frequency goes up, the power goes down. In particular, there is equal energy per octave. An octave is a doubling of frequency (20-40-80 etc.). For example, the first octave can be 20 Hz to 120 Hz; the second octave 120 Hz to 240 Hz, the third 240 Hz to 480 Hz, and so on. Thus, lower frequencies are, in essence, more heavily weighted, because this is the way people hear, i.e., they hear better at lower frequencies.

It is known to those of skill in the art to use a spectrum analyzer (SA) to find the frequency response for a room, by using an omni-directional microphone. A SA measures and displays the power versus frequency. If the SA shows something is not flat, the user can implement filters to adjust the gain, to level out the response for the room.

HDSP 502 according to aspects of the embodiments includes a pink noise generator, as described above. Combining a SA and an equalizer provides a more efficient means for equalizing a room. It can be done relatively quickly, and the results are typically flat to within a dB or two. In many cases, this might be the best that can be done.

For room equalization, most audio engineers/technicians generally do not use more than one microphone. In addition, equalization is typically done to a particular spot; generally, wherever the microphone is located.

According to aspects of the embodiments, HDSP 502 can provide automatic SA/equalization analysis and send the information through the cloud (e.g., Crestron's Fusion product) so that when problems occur, technicians can alert the property owners that problems can be developing with the acoustic space. Thus, self-test, diagnosis and reporting measurements/metrics can be done automatically. In addition, the SA can be used to test the round trip path of the telephony interface, and this information can be further used for diagnostic purposes.

Figure 10:
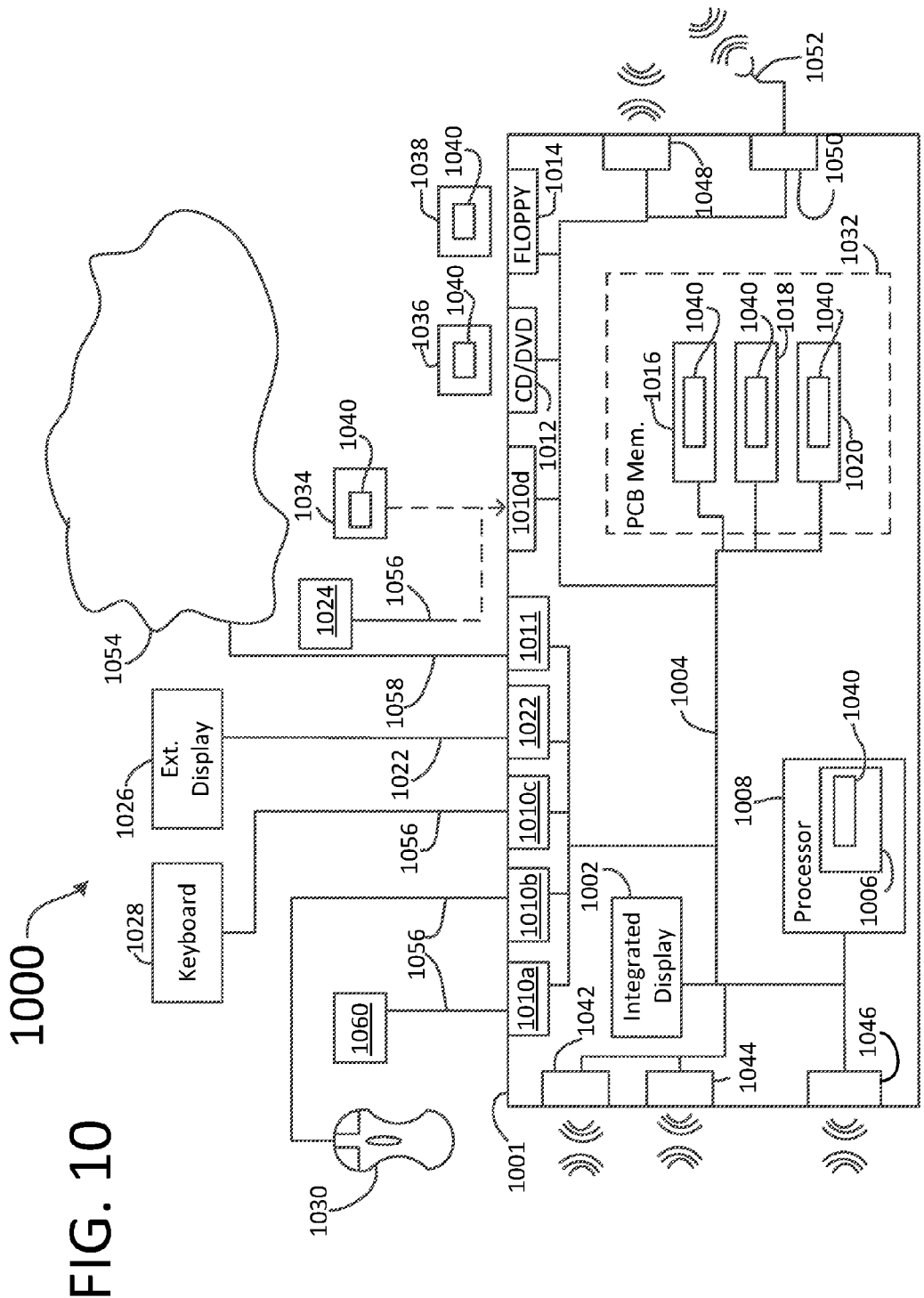
FIG. 10 illustrates one non-limiting example of a hardware embodiment of a hybrid digital signal processor suitable for use to implement the method of FIG. 6 as software for programming one or more audio objects in the according to aspects of the embodiments.

FIG. 10 illustrates one non-limiting example of a hardware embodiment of HDSP 502 suitable for use to implement method 600 as software for programming one or more audio objects 202 in HDSP 502 according to aspects of the embodiments. HDSP 502 comprises, among other items, shell/box 1001, integrated display/touch-screen 1002 (though not used in every application of HDSP 502), internal data/command bus (bus) 1004, processor board internal memory (internal memory) 1032, and one or more processors 1008 with processor internal memory 1006 (which can be typically read only memory (ROM) and/or random access memory (RAM)). Those of ordinary skill in the art can appreciate that in modern computing systems, include DSPs, parallel processing is becoming increasingly prevalent, and whereas a single processor would have been used in the past to implement many or at least several functions, it is more common currently to have a single dedicated processor for certain functions (e.g., digital signal processors) and therefore could be several processors, acting in serial and/or parallel, as required by the specific application. HDSP 502 can further comprise multiple input/output ports, such as universal serial bus ports 1010, Ethernet ports 1011, and video graphics array (VGA) ports/high definition multimedia interface (HDMI) ports 1022, among other types. Further, HDSP 502 can include externally accessible drives such as compact disk (CD)/digital video disk (DVD) read/write (RW) (CD/DVD/RW) drive 1012, and floppy diskette drive 1014 (though less popular at the present). HDSP 502 can still further include wireless communication apparatus, such as one or more of the following: Wi-Fi transceiver 1042, BlueTooth (BT) transceiver 1044, near field communications (NFC) transceiver 1046, third generation (3G)/fourth Generation (4G)/long term evolution (LTE) (3G/4G/LTE) transceiver 1048, communications satellite/global positioning system (satellite) transceiver device 1050, and antenna 1052.

Internal memory 1032 itself can comprise hard disk drive (HDD) 1016 (these can include conventional magnetic storage media, but, as is becoming increasingly more prevalent, can include flash drive memory 1034, among other types), read-only memory (ROM) 1018 (these can include electrically erasable (EE) programmable ROM (EEPROMs), ultra-violet erasable PROMs (UVPROMs), among other types), and random access memory (RAM) 1020. Usable with USB port 1010 is flash drive memory 1034, and usable with CD/DVD/RW drive 1012 are CD/DVD disks 1036 (which can be both read and write-able). Usable with floppy diskette drive 1014 are floppy diskettes 1038. External memory storage 1024 can be used to store data and programs external to box 1001 of HDSP 502, and can itself comprise another hard disk drive 1016a, flash drive memory 1034, among other types of memory storage. External memory storage 1024 is connectable to HDSP 502 via USB cable 1056. Each of the memory storage devices, or the memory storage media (1006, 1016, 1018, 1020, 1024, 1034, 1036, and 1038, among others), can contain parts or components, or in its entirety, executable software programming code or application (application, or "App") 1040, which can implement part or all of the portions of method 600 as described herein.

In addition to the above described components, HDSP 502 can also include keyboard 1028, external display 1026, printer/scanner/fax machine 1060, and mouse 1030. Other cable types that can be used with HDSP 502 include RS 232, among others, not shown, that can be used for one or more of the connections between HDSP 502 and the peripheral components described herein. Keyboard 1028, mouse 1030, and printer/scanner/fax machine 1060 are connectable to HDSP 502 via USB cable 1056, and external display 1026 is connectible to HDSP 502 via VGA cable/HDMI cable 1022. HDSP 502 can be connected to internet 1054 via Ethernet port 1011 and Ethernet cable 1058 via a router and modulator-demodulator (MODEM), neither of which are shown in FIG. 10. All of the immediately aforementioned components (1022, 1024, 1026, 1028, 1030, 1034, 1036, 1038, 1056, 1058, and 1060) are known to those of ordinary skill in the art, and this description includes all known and future variants of these types of devices.

External display 1026 can be any type of known display or presentation screen, such as liquid crystal displays (LCDs), light emitting diode displays (LEDs), plasma displays, cathode ray tubes (CRTs), among others. In addition to the user interface mechanism such as mouse 1030, HDSP 502 can further include a microphone, touch pad, joy stick, touch screen, voice-recognition system, among other interactive inter-communicative devices/programs, which can be used to enter data and voice, and which all of are known to those of skill in the art and thus a detailed discussion thereof has been omitted in fulfillment of the dual purposes of clarity and brevity.

As mentioned above, HDSP 502 can further include a plurality of wireless transceiver devices, such as Wi-Fi transceiver 1042, BT transceiver 1044, NFC transceiver 1046, 3G/4G/LTE transceiver 1048, satellite transceiver device 1050, and antenna 1052. While each of Wi-Fi transceiver 1042, BT transceiver 1044, NFC transceiver 1046, 3G/4G/LTE transceiver 1048, and satellite transceiver device 1050 has one or more specialized functions, each can also be used for other types of communications, such as accessing a cellular service provider (not shown), accessing internet 1054, texting, emailing, among other types communications and data/voice transfers/exchanges, as known to those of skill in the art. Each of Wi-Fi transceiver 1042, BT transceiver 1044, NFC transceiver 1046, 3G/4G/LTE transceiver 1048, satellite transceiver device 1050 can further include a transmitting and receiving device, and a specialized antenna, although in some instances, one antenna can be shared by one or more of Wi-Fi transceiver 1042, BT transceiver 1044, NFC transceiver 1046, 3G/4G/LTE transceiver 1048, and satellite transceiver device 1050. Alternatively, one or more of Wi-Fi transceiver 1042, BT transceiver 1044, NFC transceiver 1046, 3G/4G/LTE transceiver 1048, and satellite transceiver device 1050 will have a specialized antenna, such as satellite transceiver device 1050 to which is electrically connected at least one antenna 1052.

Further still, HDSP 502 can access internet 1054 either through a hard wired connection, such as Ethernet port 1011 as described above, or wirelessly, via Wi-Fi transceiver 1042, 3G/4G/LTE transceiver 1048 and/or satellite transceiver 1050 (and their respective antennas) according to aspects of the embodiments. HDSP 502 can also be part of a larger network configuration as in a global area network (GAN) (e.g., internet 1054), which ultimately allows connection to various landlines.

According to further aspects of the embodiments, integrated touch screen display 1002, keyboard 1028, mouse 1030, and external display 1026 (if in the form of a touch screen), can provide a means for a user to enter commands, data, digital, and analog information into HDSP 502. Integrated and external displays 1002, 1026 can be used to show visual representations of acquired data, and the status of applications that can be running, among other things.

Bus 1004 can provide a data/command pathway for the transfer and storage of data/commands between processor 1008, Wi-Fi transceiver 1042, BT transceiver 1044, NFC transceiver 1046, 3G/4G/LTE transceiver 1048, satellite transceiver device 1050, integrated display 1002, USB port 1010, Ethernet port 1011, VGA/HDMI port 1022, CD/DVD/RW drive 1012, floppy diskette drive 1014, and internal memory 1032. Through bus 1004, data can be accessed that is stored in internal memory 1032. Processor 1008 can send information for visual display to either or both of integrated and external displays 1002, 1026, and the user can send commands to system operating programs/software/Apps 1040 that might reside in processor internal memory 1006 of processor 1008, or any of the other memory devices (1036, 1038, 1016, 1018, and 1020).

HDSP 502, and either processor internal memory 1006 or internal memory 1032, can be used to implement method 600 for programming one or more audio objects in HDSP 502 according to aspects of the embodiments. Hardware, firmware, software or a combination thereof can be used to perform the various steps and operations described herein. According to aspects of the embodiments, App 1040 can be stored and distributed on multi-media storage devices such as devices 1016, 1018, 1020, 1034, 1036 and/or 1038 (described above) or other form of media capable of portably storing information. Storage media 1034, 1036 and/or 1038 can be inserted into, and read by devices such as USB port 1010, CD/DVD/RW drive 1012, and disk drives 1014, respectively.

As also will be appreciated by one skilled in the art, the various functional aspects of the embodiments can be embodied in a wireless communication device, a telecommunication network, or as a method or in a computer program product. Accordingly, aspects of the embodiments can take the form of an entirely hardware embodiment or an embodiment combining hardware and software aspects. Further, the aspects of the embodiments can take the form of a computer program product stored on a computer-readable storage medium having computer-readable instructions embodied in the medium. Any suitable computer-readable medium can be utilized, including hard disks, CD-ROMs, DVDs, optical storage devices, or magnetic storage devices such a floppy disk or magnetic tape. Other non-limiting examples of computer-readable media include flash-type memories or other known types of memories.

Further, those of ordinary skill in the art in the field of the aspects of the embodiments can appreciate that such functionality can be designed into various types of circuitry, including, but not limited to, field programmable gate array structures (FPGAs), application specific integrated circuitry (ASICs), microprocessor based systems, among other types. A detailed discussion of the various types of physical circuit implementations does not substantively aid in an understanding of the aspects of the embodiments, and as such has been omitted for the dual purposes of brevity and clarity. However, as well known to those of ordinary skill in the art, the systems and methods discussed herein can be implemented as discussed, and can further include programmable devices.

Such programmable devices and/or other types of circuitry as previously discussed can include a processing unit, a system memory, and a system bus that couples various system components including the system memory to the processing unit. The system bus can be any of several types of bus structures including a memory bus or memory controller, a peripheral bus, and a local bus using any of a variety of bus architectures. Furthermore, various types of computer readable media can be used to store programmable instructions. Computer readable media can be any available media that can be accessed by the processing unit. By way of example, and not limitation, computer readable media can comprise computer storage media and communication media. Computer storage media includes volatile and non-volatile as well as removable and non-removable media implemented in any method or technology for storage of information such as computer readable instructions, data structures, program modules or other data. Computer storage media includes, but is not limited to, RAM, ROM, EEPROM, flash memory or other memory technology, CDROM, DVD or other optical disk storage, magnetic cassettes, magnetic tape, magnetic disk storage or other magnetic storage devices, or any other medium which can be used to store the desired information and which can be accessed by the processing unit. Communication media can embody computer readable instructions, data structures, program modules or other data in a modulated data signal such as a carrier wave or other transport mechanism and can include any suitable information delivery media.

The system memory can include computer storage media in the form of volatile and/or nonvolatile memory such as read only memory (ROM) and/or random access memory (RAM). A basic input/output system (BIOS), containing the basic routines that help to transfer information between elements connected to and between the processor, such as during start-up, can be stored in memory. The memory can also contain data and/or program modules that are immediately accessible to and/or presently being operated on by the processing unit. By way of non-limiting example, the memory can also include an operating system, application programs, other program modules, and program data.

The processor can also include other removable/non-removable and volatile/nonvolatile computer storage media. For example, the processor can access a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the operating environment include, but are not limited to, magnetic tape cassettes, flash memory cards, digital versatile disks, digital video tape, solid state RAM, solid state ROM and the like. A hard disk drive can be connected to the system bus through a non-removable memory interface such as an interface, and a magnetic disk drive or optical disk drive can be connected to the system bus by a removable memory interface, such as an interface.

The embodiments discussed herein can also be embodied as computer-readable codes on a computer-readable medium. The computer-readable medium can include a computer-readable recording medium and a computer-readable transmission medium. The computer-readable recording medium is any data storage device that can store data which can be thereafter read by a computer system. Examples of the computer-readable recording medium include ROM, RAM, CD-ROMs and generally optical data storage devices, magnetic tapes, flash drives, and floppy disks. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to, when implemented in suitable electronic hardware, accomplish or support exercising certain elements of the appended claims can be readily construed by programmers skilled in the art to which the embodiments pertains.

The disclosed embodiments provide a system and method for programming one or more audio objects in a digital signal processor system. It should be understood that this description is not intended to limit the embodiments. On the contrary, the embodiments are intended to cover alternatives, modifications, and equivalents, which are included in the spirit and scope of the embodiments as defined by the appended claims. Further, in the detailed description of the embodiments, numerous specific details are set forth to provide a comprehensive understanding of the claimed embodiments. However, one skilled in the art would understand that various embodiments can be practiced without such specific details.

The disclosed embodiments provide a system, software, and a method for a suite of DSP tools that is easier to program and use and change than has been previously available, and which has additional features that many of those of skill in the art find desirable. It should be understood that this description is not intended to limit the embodiments. On the contrary, the embodiments are intended to cover alternatives, modifications, and equivalents, which are included in the spirit and scope of the embodiments as defined by the appended claims. Further, in the detailed description of the embodiments, numerous specific details are set forth to provide a comprehensive understanding of the claimed embodiments. However, one skilled in the art would understand that various embodiments may be practiced without such specific details. Furthermore, as can now be appreciated by those of skill in the art, the aspects of the embodiments address the technical problem of acquiring analog audio data, and digitizing and processing it to perform advanced processing functions that include such items as gating, parametric equalization, advanced digital filtering techniques, ducking functions, among many others. could not be readily accomplished in the analog domain. Such processing is not technically feasible in as rapid and dynamic manner as envisioned by the aspects of the embodiments without regard to the use of the systems, methods, and modes as provided and described herein.

Although the features and elements of aspects of the embodiments are described being in particular combinations, each feature or element can be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The above-described embodiments are intended to be illustrative in all respects, rather than restrictive, of the embodiments. Thus the embodiments are capable of many variations in detailed implementation that can be derived from the description contained herein by a person skilled in the art. No element, act, or instruction used in the description of the present application should be construed as critical or essential to the embodiments unless explicitly described as such. Also, as used herein, the article "a" is intended to include one or more items.

All United States patents and applications, foreign patents, and publications discussed above are hereby incorporated herein by reference in their entireties.

Industrial Applicability

To solve the aforementioned problems, the aspects of the embodiments are directed towards a suite of DSP tools that is easier to program and use and change than has been previously available, and which has additional features that many of those of skill in the art find desirable.

Alternate Embodiments

Alternate embodiments may be devised without departing from the spirit or the scope of the different aspects of the embodiments.

What is claimed is:

1. A method executed by audio processing software on one or more electronic devices in a computer system to process digital audio signals, the method comprising:
   digitizing a received audio signal; and
   performing a plurality of audio processing functions on the digitized audio signals, each of the audio processing functions having at least one programmable parameter, and wherein each of the audio processing functions are categorized and grouped as audio objects, and organized into a channel strip, the channel strip processing digitized audio signals for a particular received audio signal, and wherein,
      the audio objects are in a fixed, prearranged order, so that the digitized received audio signals are processed by a predefined number of N audio objects, and wherein the N audio objects occur in a fixed sequence, and further wherein,
      the N audio objects comprise a first subset of non-exchangeable audio objects and a second subset of exchangeable audio objects, such that any one or more of the second subset of audio objects can be exchanged by a replacement audio object, and further wherein when the audio processing functions are programmed, they can be saved without compiling the audio processing software.

2. A computer system for processing digital audio signals, the system comprising:
   a digitizer adapted to digitize an audio signal; and a processor that comprises a computer program, the computer program including non-transitory executable software code that, when executed, is adapted to perform a plurality of audio processing functions on the digitized audio signals, each of the audio processing functions having at least one programmable parameter, and wherein each of the audio processing functions are categorized and grouped as audio objects, and organized into a channel strip, the channel strip processing digitized audio signals for a particular received audio signal, and wherein, the audio objects are in a fixed, prearranged order, so that the digitized received audio signals are processed by a predefined number of N audio objects, and wherein the N audio objects occur in a fixed sequence, and further wherein, the N audio objects comprise a first subset of non-exchangeable audio objects and a second subset of exchangeable audio objects, such that any one or more of the second subset of audio objects can be exchanged by a replacement audio object, and further wherein when the audio processing functions are programmed, they can be saved without compiling the audio processing software.

3. A non-transitory machine readable storage medium having stored thereon a computer program for processing digitized audio signals, the computer program comprising a routine set of instructions for causing the machine to perform the steps of:

digitizing a received audio signal; and performing a plurality of audio processing functions on the digitized audio signals, each of the audio processing functions having at least one programmable parameter, and wherein each of the audio processing functions are categorized and grouped as audio objects, and organized into a channel strip, the channel strip processing digitized audio signals for a particular received audio signal, and wherein, the audio objects are in a fixed, prearranged order, so that the digitized received audio signals are processed by a predefined number of N audio objects, and wherein the N audio objects occur in a fixed sequence, and further wherein, the N audio objects comprise a first subset of non-exchangeable audio objects and a second subset of exchangeable audio objects, such that any one or more of the second subset of audio objects can be exchanged by a replacement audio object, and further wherein when the audio processing functions are programmed, they can be saved without compiling the audio processing software.

\* \* \* \* \*